US011451450B2

(12) United States Patent
Patki et al.

(10) Patent No.: US 11,451,450 B2
(45) Date of Patent: *Sep. 20, 2022

(54) SCALABLE CONTROL PLANE FOR TELEMETRY DATA COLLECTION WITHIN A DISTRIBUTED COMPUTING SYSTEM

(71) Applicant: Juniper Networks, Inc., Sunnyvale, CA (US)

(72) Inventors: Neeren Shripad Patki, Saratoga, CA (US); Harshit Naresh Chitalia, Mountain View, CA (US); Moitrayee Gupta, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,351

(22) Filed: Feb. 26, 2021

(65) Prior Publication Data
US 2021/0409282 A1 Dec. 30, 2021

Related U.S. Application Data

(63) Continuation of application No. 16/916,798, filed on Jun. 30, 2020, now Pat. No. 11,005,721.

(51) Int. Cl.
*H04L 41/14* (2022.01)
*H04L 41/042* (2022.01)
(Continued)

(52) U.S. Cl.
CPC .......... *H04L 41/14* (2013.01); *G06F 16/2379* (2019.01); *H04L 41/042* (2013.01);
(Continued)

(58) Field of Classification Search
CPC ....... H04L 29/08135; H04L 41/04–048; H04L 41/08–0809; H04L 41/0876–0893;
(Continued)

(56) References Cited

U.S. PATENT DOCUMENTS 7,185,103 B1   2/2007  Jain
8,839,171 B1   9/2014  Varadarajan et al.
(Continued)

FOREIGN PATENT DOCUMENTS

CN   107925588 A   4/2018
CN   108694071 A   10/2018
(Continued)

OTHER PUBLICATIONS

Cisco, "Introduction to Cisco IOS NetFlow—A Technical Overview," Cisco IOS NetFlow, May 2012, 12 pp.
(Continued)

*Primary Examiner* — Brendan Y Higa
(74) *Attorney, Agent, or Firm* — Shumaker & Sieffert, P.A.

(57) ABSTRACT

An example control plane that is executed on one or more processors in a distributed computing system is configured to receive an indication of a node to be onboarded into the distributed computing system, wherein the node comprises one of a compute node or a network device node, to discover one or more compute resources or network device resources that are associated with the node, and to assign, based on the discovery, the node to a collector that is executed in the distributed computing system, wherein the collector is configured to collect real-time telemetry data for the node during operation of the node. The control plane is further configured to receive, from the collector, the real-time telemetry data for the node that is collected by the collector, and to output, for display, a visual representation of the real-time telemetry data for the node.

20 Claims, 8 Drawing Sheets

(51) Int. Cl.
    *H04L 41/046*     (2022.01)
    *H04L 41/22*     (2022.01)
    *H04L 43/045*     (2022.01)
    *H04L 43/065*     (2022.01)
    *H04L 41/0806*     (2022.01)
    *H04L 67/10*     (2022.01)
    *G06F 16/23*     (2019.01)

(52) U.S. Cl.
    CPC ........ *H04L 41/046* (2013.01); *H04L 41/0806* (2013.01); *H04L 41/22* (2013.01); *H04L 43/045* (2013.01); *H04L 43/065* (2013.01); *H04L 67/10* (2013.01)

(58) Field of Classification Search
    CPC ....... H04L 41/12; H04L 41/5041–5054; H04L 43/00–50; H04L 67/10
    See application file for complete search history.

(56) References Cited

U.S. PATENT DOCUMENTS

| | | | |
|---|---|---|---|
| 9,047,145 | B2* | 6/2015 | Chakravarty ....... H04L 67/2823 |
| 9,641,435 | B1 | 5/2017 | Sivaramakrishnan |
| 10,296,551 | B2 | 5/2019 | Minwalla et al. |
| 10,498,608 | B2* | 12/2019 | Sethi ................... H04L 41/0853 |
| 10,567,288 | B1 | 2/2020 | Mutnuru |
| 10,673,714 | B1 | 6/2020 | Chitalia et al. |
| 10,833,951 | B2 | 11/2020 | Do et al. |
| 10,880,199 | B2 | 12/2020 | Shaikh et al. |
| 11,005,721 | B1* | 5/2021 | Patki ..................... H04L 41/042 |
| 11,272,267 | B2 | 3/2022 | Herdrich et al. |
| 2007/0058631 | A1 | 3/2007 | Mortier et al. |
| 2013/0016625 | A1 | 1/2013 | Murias et al. |
| 2014/0201356 | A1* | 7/2014 | Hung ................... H04L 41/046 709/224 |
| 2014/0280338 | A1 | 9/2014 | Metz et al. |
| 2015/0120959 | A1 | 4/2015 | Bennett et al. |
| 2015/0188837 | A1* | 7/2015 | Djukic ................. H04L 47/70 709/226 |
| 2017/0187607 | A1 | 6/2017 | Shaikh et al. |
| 2017/0251368 | A1 | 8/2017 | Ross et al. |
| 2018/0287902 | A1 | 10/2018 | Chitalia et al. |
| 2018/0367412 | A1* | 12/2018 | Sethi ................... H04L 41/0853 |
| 2019/0102460 | A1* | 4/2019 | Tabak .................... G06Q 40/12 |
| 2019/0104022 | A1* | 4/2019 | Power ................. H04L 41/0806 |
| 2019/0165997 | A1 | 5/2019 | Shaikh et al. |
| 2020/0007405 | A1 | 1/2020 | Chitalia et al. |
| 2020/0137540 | A1 | 4/2020 | Kanter |
| 2020/0233685 | A1 | 7/2020 | Petkov et al. |
| 2020/0275357 | A1 | 8/2020 | Bordeleau et al. |
| 2020/0382395 | A1* | 12/2020 | Kerry .................. G06F 11/3006 |
| 2021/0160158 | A1* | 5/2021 | Chintala ............... H04L 43/045 |

FOREIGN PATENT DOCUMENTS

| | | |
|---|---|---|
| CN | 110659176 A | 1/2020 |
| WO | 2005/109754 A1 | 11/2005 |
| WO | 2012/122435 A2 | 9/2012 |
| WO | 2013/184846 A1 | 12/2013 |

OTHER PUBLICATIONS

Juniper Networks, Inc., "Traffic Sampling, Forwarding, and Monitoring Feature Guide for Routing Devices," May 13, 2015, 314 pp.

Juniper Networks, Inc., "Juniper Flow Monitoring—J-Flow on J Series Services Routers and Branch SRX Series Services Gateways," Mar. 2011, 10 pp.

Kompella et al. "Virtual Private LAN Service (VPLS) Using BGP for Auto-Discovery and Signaling" Network Working Group, RFC 4761, Jan. 2007, 26 pgs.

Zimmermann, "OSI Reference Model—the ISO Model of Architecture for Open Systems Interconnection," published in IEEE Transactions on Communications, vol. 28, No. 4, dated Apr. 1980, 8 pp.

"OpenStack," Wikipedia, the free encyclopedia, last edit made on Jun. 12, 2020, Retrieved from: https://en.wikipedia.org/wiki/OpenStack, accessed on Jun. 29, 2020, 25 pp.

Hopps, "Analysis of an Equal-Cost Multi-Path Algorithm," RFC 2992, Network Working Group, Nov. 2000, 8 pp.

Notice of Allowance dated Jan. 29, 2021 received in U.S. Appl. No. 16/916,798, 9 pp.

U.S. Appl. No. 16/916,798 entitled "Scalable Control Plane for Telemetry Data Collection Within a Distributed Computing System" Juniper Networks, Inc. (inventor: Patki et al.), filed Jun. 30, 2020.

Extended Search Report from counterpart European Application No. 20197006.8, dated Feb. 25, 2021, 9 pp.

Office Action from counterpart Chinese Application No. 202010997020.6 dated Jun. 8, 2022, 25 pp.

Response to Extended Search Report dated Feb. 25, 2021, from counterpart European Application No. 20197006.8 filed Jul. 5, 2022, 24 pp.

\* cited by examiner

SCALABLE CONTROL PLANE FOR TELEMETRY DATA COLLECTION WITHIN A DISTRIBUTED COMPUTING SYSTEM

This application is a continuation of U.S. application Ser. No. 16/916,798, filed Jun. 30, 2020, the entire content of which is herein incorporated by reference.

TECHNICAL FIELD

This disclosure generally relates to computer networks.

BACKGROUND

In a typical data center or other distributed computing system, a large collection of interconnected devices that provide computing and/or storage capacity for execution of various applications. For example, a data center may comprise one or more facilities that host applications and services for subscribers or customers of the data center. The data center may, for example, host infrastructure equipment, such as networking and storage systems, redundant power supplies, and environmental controls. In some data centers, clusters of storage systems and application servers are interconnected via a high-speed network fabric provided by one or more tiers of network devices, such as switches and routers. Certain sophisticated enterprises and service providers may employ multiple data centers with infrastructure that is spread throughout the world, with subscriber support equipment located in various physical hosting facilities.

Data centers and other distributed computing systems are becoming core foundations of the modern information technology (IT) infrastructure. For example, modern data centers have extensively utilized environments in which various entities, such as compute nodes, network device nodes, and storage nodes are deployed and executed on an underlying platform composed of physical computing devices.

SUMMARY

In general, this disclosure describes techniques for implementing a scalable control plane for telemetry data collection within a distributed computing system, which provides a common control plane across different services of the distributing computing system. As a result, the capabilities of various different types of telemetry collectors within the distributed computing system (e.g., compute node collectors, network device node collectors) may be controlled by a single control plane. The single control plane is therefore configured to onboard both compute nodes and network device nodes onto the distributed computing system, and to assign these compute nodes and network device nodes to respective compute node collectors and network device node collectors. This implementation results in an elastic, highly scalable design that can also leverage an orchestration platform (e.g., a container orchestration platform) to create a single cluster of services for the control plane. With such a design, the deployment model for the control plane becomes simpler, as well as the user interaction therewith, since there is a single, virtual "pane of glass" provided by the control plane across all types of data collection within the distributed computing system.

In one example, a method includes receiving, by a control plane executed on one or more processors in a distributed computing system, an indication of a node to be onboarded into the distributed computing system, wherein the control plane is configured to onboard both compute nodes and network device nodes into the distributed computing system, and wherein the node comprises one of a compute node or a network device node, discovering, by the control plane, one or more compute resources or network device resources that are associated with the node, and assigning, by the control plane, the node to a collector that is executed in the distributed computing system, wherein the collector is configured to collect real-time telemetry data for the node during operation of the node, and wherein the control plane is configured to assign the compute nodes and the network device nodes of the distributed computing system to respective compute node collectors or network device node collectors. The example method further includes receiving, by the control plane and from the collector, the real-time telemetry data for the node that is collected by the collector, and outputting, by the control plane and for display, a visual representation of the real-time telemetry data for the node.

In another example, a computing system comprises includes one or more processors and at least one computer-readable storage device. The at least one computer-readable storage device stores instructions that, when executed, cause the one or more processors to: receive, by a control plane, an indication of a node to be onboarded into a distributed computing system, wherein the control plane is configured to onboard both compute nodes and network device nodes into the distributed computing system, and wherein the node comprises one of a compute node or a network device node; discover, by the control plane, one or more compute resources or network device resources that are associated with the node; assign, by the control plane, the node to a collector that is executed in the distributed computing system, wherein the collector is configured to collect real-time telemetry data for the node during operation of the node, and wherein the control plane is configured to assign the compute nodes and the network device nodes of the distributed computing system to respective compute node collectors or network device node collectors; receive, by the control plane and from the collector, the real-time telemetry data for the node that is collected by the collector; and output, by the control plane and for display, a visual representation of the real-time telemetry data for the node.

In another example, a computer-readable storage device stores instructions that are executable by at least one processor to: receive, by a control plane, an indication of a node to be onboarded into a distributed computing system, wherein the control plane is configured to onboard both compute nodes and network device nodes into the distributed computing system, and wherein the node comprises one of a compute node or a network device node; discover, by the control plane, one or more compute resources or network device resources that are associated with the node; assign, by the control plane, the node to a collector that is executed in the distributed computing system, wherein the collector is configured to collect real-time telemetry data for the node during operation of the node, and wherein the control plane is configured to assign the compute nodes and the network device nodes of the distributed computing system to respective compute node collectors or network device node collectors; receive, by the control plane and from the collector, the real-time telemetry data for the node that is collected by the collector; and output, by the control plane and for display, a visual representation of the real-time telemetry data for the node.

The details of one or more examples are set forth in the accompanying drawings and the description below. Other features, objects, and advantages will be apparent from the description and drawings, and from the claims.

DETAILED DESCRIPTION

Figure 1A:
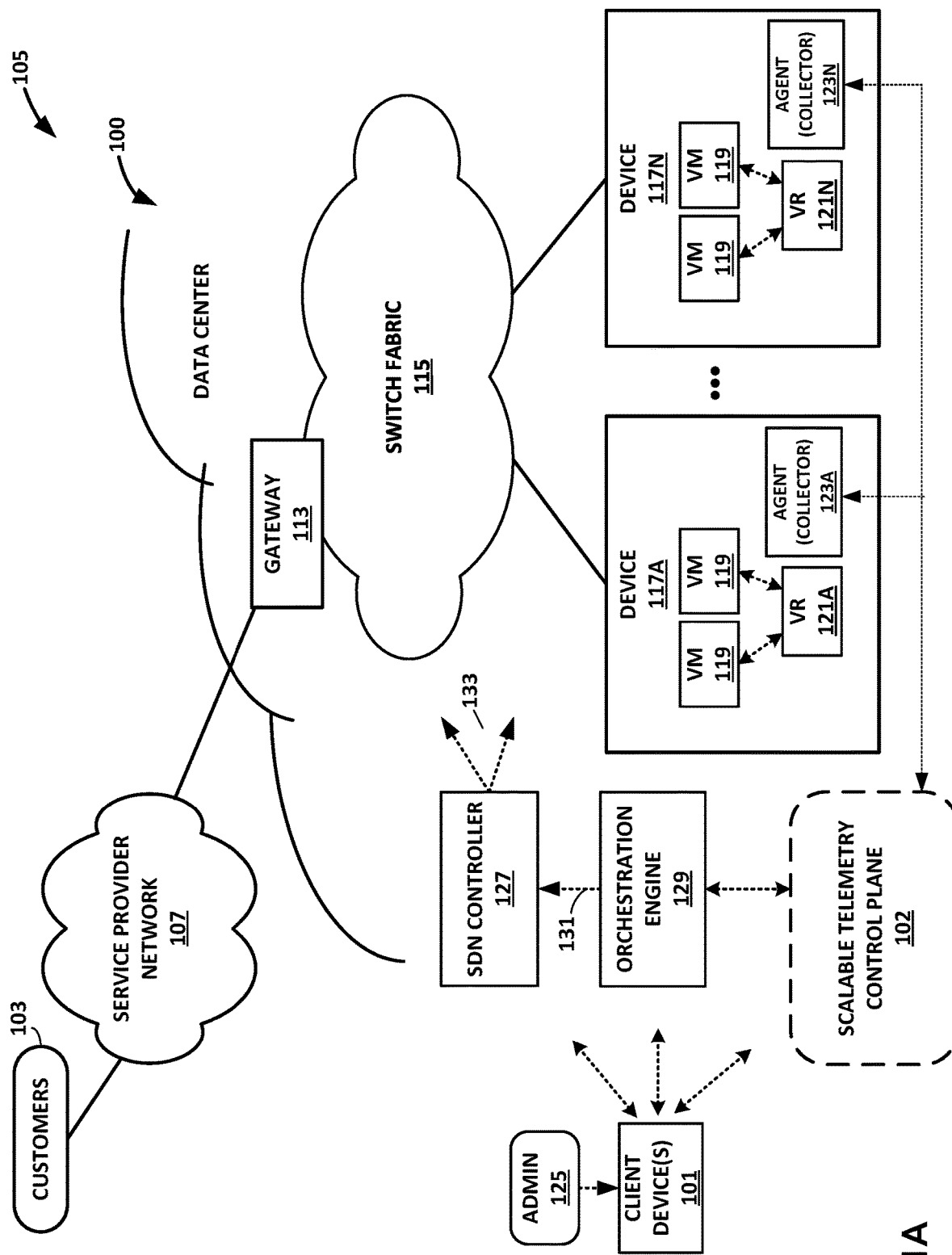
FIG. 1A is a block diagram illustrating an example network that includes an example distributed computing system that implements a scalable telemetry control plane, in accordance with one or more aspects of the present disclosure.

As noted above, distributed computing systems are becoming a core foundation of the modern information technology (IT) infrastructure. In some distributed computing systems, a large collection of interconnected nodes (e.g., physical or virtual devices) may provide computing and/or storage capacity for execution of various applications. For instance, a distributed computing system may comprise a facility that hosts applications and services for customers, and the system may comprise local and/or remote resources. Modern distributed systems have extensively utilized virtualized environments in which virtual hosts, such virtual machines or containers, are deployed and executed on an underlying compute platform composed of physical computing devices. As used herein, the term distributed computing system may refer to physical location(s) or frameworks for the system, and/or the computing infrastructure (e.g., compute and/or storage resources) included in or otherwise provided by the system. A distributed computing system may include one or more clusters of nodes (e.g., bare-metal servers, virtual machines), as described in more detail below.

A distributed computing system may comprise computing devices or servers that are geographically co-located in one geographic location, or that are dispersed across multiple different locations. A distributed computing system may provide one or more compute resources and/or storage resources (e.g., virtual and/or physical resources), which may be utilized by one or more applications. For instance, compute resources may include one or more compute nodes, which are virtual or physical nodes that provide computing power and/or functionality. As one example, a compute node may comprise a virtual machine that is configured to provide one or more application containers in which applications are executed.

Virtualization within a distributed system can provide several advantages. One advantage is that virtualization can provide significant improvements to efficiency. As the underlying physical computing devices (e.g., servers) have become increasingly powerful with the advent of multicore microprocessor architectures, with a large number of cores per physical processing unit, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier.

In general, this disclosure describes techniques for implementing a scalable control plane for telemetry data collection with a distributed computing system, which provides a common control plane across different services of the distributing computing system. As a result, the capabilities of all telemetry collectors within the distributed computing system (e.g., compute node collectors, network device node collectors) may be controlled by a single control plane. The single control plane is therefore configured to onboard both compute nodes and network device nodes onto the distributed computing system, and to assign these compute nodes and network device nodes to respective compute node collectors and network device node collectors within the distributed computing system. This implementation results in an elastic, highly scalable design that can also leverage an orchestration platform to create a single cluster of services for the control plane. With such a design, the deployment model becomes simpler, as well as the user interaction therewith, since there is a single, virtual "pane of glass" provided by the control plane across all types of data collection.

According to the disclosed techniques, the collective services of the control plane may be responsible for onboarding and distributing nodes to various different types of telemetry collectors within the distributed computing system. Once a node has been onboarded, the services of the control plane may discover the node's communication interfaces and connection information, and may associate the node with a particular collector based on the discovered information. The collector may then configure the node, as appropriate, and start collecting data from the node. This data may then be streamed to the control plane, which may provide it to a dashboard for data visualization, as introduced in FIGS. 1A-1B and described in further detail below.

FIG. 1A is a block diagram illustrating an example network that includes an example distributed computing system that implements a scalable telemetry control plane, in accordance with one or more aspects of the present disclosure. FIG. 1A illustrates one example implementation of network 105 and data center 100 that hosts one or more cloud-based computing networks, computing domains or projects, generally referred to herein as a cloud computing cluster. Data center 100 may be one example of, or may include, a distributed computing system. The cloud-based computing clusters may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of network 105 and data center 100 may be appropriate in other instances. Such implementations may include a subset of the components included in the example of FIG. 1A and/or may include additional components not shown in FIG. 1A.

In the example of FIG. 1A, data center 100 provides an operating environment for applications and services for customers 103 coupled to data center 100 by service provider network 107. Although functions and operations described in connection with network 105 of FIG. 1A may be illustrated as being distributed across multiple devices in FIG. 1A, in other examples, the features and techniques attributed to one or more devices in FIG. 1A may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1A or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 100 hosts infrastructure equipment, such as networking and storage systems, redundant power supplies, and environmental controls. Service provider network 107 may be coupled to one or more networks administered by other providers, and may thus form part of a large-scale public network infrastructure, e.g., the Internet.

In some examples, data center 100 may represent one of many geographically distributed network data centers. As illustrated in the example of FIG. 1A, data center 100 is a facility that provides network services for customers 103. Customers 103 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 100 is an individual network server, a network peer, or otherwise.

In the example of FIG. 1A, data center 100 includes a set of storage systems and devices, including device 117A through device 117N (collectively "devices 117") interconnected via high-speed switch fabric 115 provided by one or more tiers of physical network switches and routers. In some cases, devices 117 may comprise servers that function as physical compute nodes of the data center. For example, devices 117 may each provide an operating environment for execution of one or more customer-specific virtual machines 119 ("VMs" in FIG. 1A) or other virtualized instances, such as containers. One or more of devices 117 may alternatively each comprise host computing devices or, more simply, as hosts. A device 117 may execute one or more virtualized instances, such as virtual machines, containers, or other virtual execution environment for running one or more services, such as virtualized network functions (VNFs). In some examples, one or more of devices 117 may comprise one or more network devices (e.g., switches, routers, hubs, gateways, firewalls, etc.) within data center 100.

Although not shown, switch fabric 115 may include top-of-rack (TOR) switches coupled to a distribution layer of chassis switches, and data center 100 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 115 may perform layer 3 routing to route network traffic between data center 100 and customers 103 by service provider network 107. Gateway 113 acts to forward and receive packets between switch fabric 115 and service provider network 107.

Software-Defined Networking ("SDN") controller 127 provides a logically and in some cases physically centralized controller for facilitating operation of one or more virtual networks within data center 100 in accordance with one or more examples of this disclosure. The terms SDN controller and Virtual Network Controller ("VNC") may be used interchangeably throughout this disclosure. In some examples, SDN controller 127 operates in response to configuration input received from orchestration engine 129 via northbound application programming interface (API) 131, which in turn operates in response to configuration input received from an administrator 125 interacting with and/or operating one or more client devices 101. Additional information regarding SDN controller 127 operating in conjunction with other devices of data center 100 or other software-defined network is found in International Application Number PCT/US 2013/044378, filed Jun. 5, 2013 and entitled "PHYSICAL PATH DETERMINATION FOR VIRTUAL NETWORK PACKET FLOWS," which is incorporated by reference herein in its entirety.

Client devices 101 may be implemented as any suitable device for interacting presenting output and/or accepting user input. For instance, client devices 101 may include a display. Client devices 101 may be a computing system, such as a mobile or non-mobile computing device operated by a user and/or by administrator 125. Client devices 101 may, for example, represent a workstation, a laptop or notebook computer, a desktop computer, a tablet computer, or any other computing device that may be operated by a user and/or present a user interface in accordance with one or more aspects of the present disclosure.

In some examples, client devices 101 may be physically separate from and/or in a different location than scalable telemetry control plane 102. In such examples, client devices 101 may communicate with control plane 102 over a network or other means of communication. In other examples, client devices 101 may be a local peripheral of control plane 102, or may be integrated into control plane 102.

As will be described in further detail below, including the description of FIG. 1B, the present disclosure describes techniques for implementing a scalable control plane 102 for telemetry data collection with a distributed computing system, such as data center 100, which provides a common control plane across different services of the distributing computing system. As a result, the capabilities of all telemetry collectors 123 (e.g., collectors associated with devices 117 such as compute nodes or network device nodes) may be controlled by a single control plane 102. This implementation results in an elastic, highly scalable design that can create a single cluster of services for control plane 102, as described in further detail below in reference to FIG. 1B.

In some examples, orchestration engine 129 manages functions of data center 100 such as compute, storage, networking, and application resources. For example, orchestration engine 129 may create a virtual network for a tenant within data center 100 or across data centers. Orchestration engine 129 may attach virtual machines (VMs) to a tenant's virtual network. Orchestration engine 129 may connect a tenant's virtual network to an external network, e.g. the Internet or a virtual private network (VPN). Orchestration engine 129 may implement a security policy across a group of VMs or to the boundary of a tenant's network. Orchestration engine 129 may deploy a network service (e.g. a load balancer) in a tenant's virtual network. As will be described in further detail below, orchestration engine 129 may include a container orchestration platform that manages the instantiation and/or deployment of pods and/or containers within data center 100. In some examples, orchestration engine 129 may be implemented as one or more orchestration platform services (e.g., orchestration platform services 108 shown in FIG. 1B) that are part of control plane 102.

In some examples, SDN controller 127 manages the network and networking services such load balancing, security, and allocate resources from devices 117 to various applications via southbound API 133. That is, southbound API 133 represents a set of communication protocols utilized by SDN controller 127 to make the actual state of the network equal to the desired state as specified by orchestration engine 129. For example, SDN controller 127 implements high-level requests from orchestration engine 129 by configuring physical switches, e.g. TOR switches, chassis switches, and switch fabric 115; physical routers; physical service nodes such as firewalls and load balancers; and virtual services such as virtual firewalls in a VM. SDN controller 127 maintains routing, networking, and configuration information within a state database. In certain examples, the functionality described herein in reference to SDN controller 127 and control plane 102 may be combined within one or more controllers within data center 100.

Typically, the traffic between any two network devices, such as between network devices (not shown) within switch fabric 115 or between devices 117 and customers 103 or between devices 117, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Virtual routers 121 (virtual router 121A to virtual router 121N, collectively "virtual routers 121" in FIG. 1A) execute multiple routing instances for corresponding virtual networks within data center 100 and routes the packets to appropriate virtual machines executing within the operating environment provided by devices 117. Each of devices 117 may include a virtual router. Packets received by virtual router 121A of device 117A, for instance, from the underlying physical network fabric may include an outer header to allow the physical network fabric to tunnel the payload or "inner packet" to a physical network address for a network interface of device 117A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of devices 117 may receive inbound tunnel packets of a packet flow from one or more TOR switches within switch fabric 115 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on devices 117 are described in U.S. Pat. No. 9,641,435, issued on May 2, 2017 and entitled "PACKET SEGMENTATION OFFLOAD FOR VIRTUAL NETWORKS," which is incorporated by reference herein in its entirety.

In some example implementations, virtual routers 121 executing on devices 117 steer received inbound tunnel packets among multiple processor cores to facilitate packet processing load balancing among the cores when processing the packets for routing to one or more virtual and/or physical machines. As one example, device 117A may include multiple network interface cards and multiple processor cores to execute virtual router 121A and steers received packets among multiple processor cores to facilitate packet processing load balancing among the cores. For instance, a particular network interface card of device 117A may be associated with a designated processor core to which the network interface card directs all received packets. The various processor cores, rather than processing each of the received packets, offloads flows to one or more other processor cores, in accordance with a hash function applied to at least one of the inner and outer packet headers, for processing to take advantage of available work cycles of the other processor cores.

As indicated above, and as described below and also in further detail in reference to FIG. 1B, data center 100 further includes a control plane 102. As will be described in further detail below, control plane 102 interacts with monitoring agents 123A-123N (collectively "agents 123", which may also be referred to herein as "collectors"). Collectors 123 which are deployed within or coupled to at least some of the respective devices 117 for monitoring resource usage of the physical compute nodes or network device nodes, as well as any virtualized host, such as VM 119, executing on the physical host. In this way, collectors 123 provide distributed mechanisms for collecting a wide variety of usage metrics for use by control plane 102. In example implementations, collectors 123 run on the lowest level compute nodes of the infrastructure of data center 100 that provide computational resources to execute application workload. A compute node may, for example, be a bare-metal host of device 117A/117N, a virtual machine 119, a container or the like. In some cases, collectors 123 may collect telemetry data for the compute nodes on which they execute. In some cases, collectors 123 may collect telemetry data for network device nodes in data center 100 to which they are communicatively coupled. As described in further detail below, control plane 102 may assign collectors 123 to individual nodes as they are onboarded into data center 100. In various cases, collectors 123 may execute as part of a respective hypervisor, or may execute within kernel space or as part of a kernel.

In some examples, control plane 102 obtains the usage metrics from collectors 123 and constructs a dashboard (e.g., a set of user interfaces) to provide visibility into operational performance and infrastructure resources of data center 100. Control plane 102 may, for example, communicate the dashboard to client devices 101 for display to administrator 125. In addition, control plane 102 may apply analytics and machine learning to the collected metrics to provide near or seemingly near real-time and historic monitoring, performance visibility and dynamic optimization to improve orchestration, security, accounting and planning within data center 100.

In some examples, control plane 102 may be configured to determine and/or identify elements in the form of the virtual machines, containers, services, and/or applications executing on each of devices 117. As used herein, a resource generally refers to a consumable component of the virtualization infrastructure, i.e., a component that is used by the infrastructure, such as central processing units (CPUs), memory, disk, disk I/O, network I/O, virtual CPUs, and the like. A resource may have one or more characteristics each associated with a metric that is analyzed by control plane. In general, an infrastructure element, also referred to herein as an element, is a component of the infrastructure that includes or consumes consumable resources in order to operate. Example elements include hosts, physical or virtual network devices, instances (e.g., virtual machines, containers, or other virtual operating environment instances), aggregates, projects, and services. In some cases, an entity may be a resource for another entity. Virtual network devices may include, e.g., virtual routers and switches, vRouters, vSwitches, Open Virtual Switches, and Virtual Tunnel Forwarders (VTFs). A metric is a value that measures the amount of a resource, for a characteristic of the resource, that is consumed by an element.

Control plane 102 may also analyze internal processor metrics received from collectors 123, and classify one or more virtual machines 119 based on the extent to which each virtual machine uses shared resources of devices 117 (e.g., classifications could be CPU-bound, cache-bound, memory-bound). Control plane 102 may interact with orchestration engine 129 to cause orchestration engine 129 to adjust, based on the classifications of virtual machines 119 executing on devices 117, the deployment of one or more virtual machines 119 on devices 117.

Control plane 102 may be implemented as or within any suitable computing device, or across multiple computing devices. Control plane 102, or components of control plane 102, may be implemented on a controller compute node of data center 100 or on one or more compute nodes of data center 100 (e.g., as part of SDN controller 127 or a separate controller). In some examples, control plane 102 may include a number of modules executing on a class of compute nodes (e.g., "infrastructure nodes") included within data center 100. Such nodes may be OpenStack infrastructure service nodes or Kubernetes master nodes, and/or may be implemented as virtual machines. In some examples, control plane 102 may have network connectivity to some or all other compute nodes within data center 100, and may also have network connectivity to other infrastructure services that manage data center 100.

In some cases, the dashboards output by control plane 102 may include a graphical view that provides a quick, visual overview of resource utilization by instance using histograms. The bins of such histograms may represent the number of instances that used a given percentage of a resource, such CPU utilization. By presenting data using histograms, the dashboards present information in a way that allows administrator 125, if the dashboard is presented at client devices 101, to quickly identify patterns that indicate under-provisioned or over-provisioned instances. In some examples, the dashboards may highlight resource utilization by instances on a particular project or host, or total resource utilization across all hosts or projects, so that administrator 125 may understand the resource utilization in context of the entire infrastructure.

For examples, these dashboards may include information relating to costs for use of compute, network, and/or storage resources, as well as costs incurred by a project. The dashboards may also present information about the health and risk for one or more virtual machines 119 or other resources within data center 100. In some examples, "health" may correspond to an indicator that reflects a current state of one or more virtual machines 119. For example, an example virtual machine that exhibits a health problem may be currently operating outside of user-specified performance policy. Health and risk indicators may be determined based on monitored metrics and/or alarms corresponding to those metrics.

Collectors 123 may execute on one or more of devices 117 to monitor some or all of the performance metrics associated with devices 117 and/or virtual machines 119 executing on devices 117. Collectors 123 and/or control plane 102 may analyze monitored information and/or metrics and generate operational information and/or intelligence associated with an operational state of devices 117 and/or one or more virtual machines 119 executing on such devices 117. Collectors 123 may interact with a kernel operating one or more devices 117 to determine, extract, or receive internal processor metrics associated with use of shared resources by one or more processes and/or virtual machines 119 executing at devices 117. Collectors 123 may perform monitoring and analysis locally at each of devices 117. In some examples, collectors 123 may perform monitoring and/or analysis in a near and/or seemingly real-time manner.

Control plane 102 may configure collectors 123 to monitor for conditions that trigger an alarm. For example, control plane 102 may detect input from client devices 101 that control plane 102 determines corresponds to user input. Control plane 102 may further determine that the user input corresponds to information sufficient to configure a user-specified alarm that is based on values for one or more metrics. Collectors 123 may monitor devices 117 for conditions on which the alarm is based, as specified by the policies received from control plane 102. In some examples, control plane 102 may generate policies and establish alarm conditions without user input. For example, control plane 102 may apply analytics and machine learning to metrics collected by collectors 123. Control plane 102 may analyze the metrics collected by collectors 123 over various time periods. Control plane 102 may determine, based on such analysis, information sufficient to configure an alarm for one or more metrics. Control plane 102 may process the information and generate one or more policies that implements the alarm settings. Control plane 102 may communicate information about the policy to collectors 123 executing on devices 117. Each of collectors 123 may thereafter monitor conditions and respond to conditions that trigger an alarm pursuant to the corresponding policies generated without user input.

Various components, functional units, and/or modules illustrated in FIG. 1A (e.g., client devices 101, orchestration engine 129, SDN controller 127, control plane 102, collectors 123) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module.

Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Further example techniques by which control plane 102 interacts with devices 117 and collectors 123 within data center 100 are described in U.S. Pat. No. 10,673,714, issued on Jun. 2, 2020 and entitled "NETWORK DASHBOARD WITH MULTIFACETED UTILIZATION VISUALIZATIONS," which is incorporated by reference herein in its entirety.

Figure 1B:
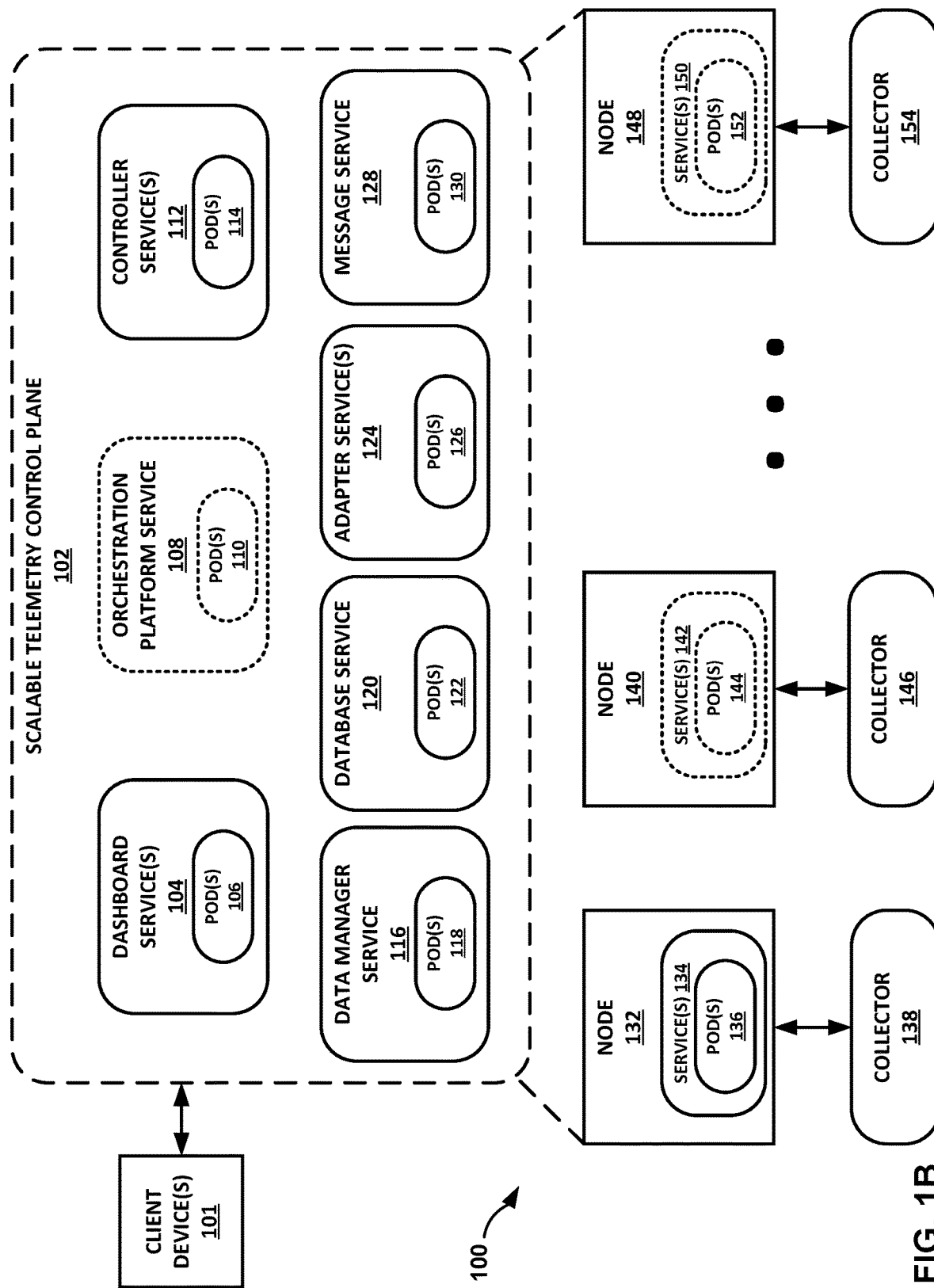
FIG. 1B is a block diagram illustrating an example scalable telemetry control plane within a distributed computing system, in accordance with one or more aspects of the present disclosure.

FIG. 1B is a block diagram illustrating an example scalable telemetry control plane 102 within a distributed computing system, in accordance with one or more aspects of the present disclosure. Data center 100 shown in FIG. 1A may be one example of, or may include, a distributed computing system. In FIG. 1B, data center 100 shown in FIG. 1A is referred to as distributed computing system 100. As illustrated in FIG. 1B, distributed computing system 100 includes a cluster of any two or more nodes, such as nodes 132, 140, and 148. These nodes include at least one controller node (e.g., node 132), as well as one or more other nodes (e.g., nodes 140, 148). In various examples, nodes 132, 140, 148 of distributed computing system 100 may include any number of compute nodes, network device nodes, and/or storage nodes, and each of these nodes may in some cases comprise, e.g., a bare-metal server (e.g., one of devices 117 in FIG. 1A) or a virtual machine (e.g., one of VMs 119 in FIG. 1A). Nodes 132, 140, 148 of distributed computing system 100 may be physically located at one geographical location or distributed among different geographical locations.

In general, one or more of nodes 132, 140, 148 may provide an operating environment for applications and services for compute, network devices, and/or storage resources that are included in or coupled to the respective node. One or more of nodes 132, 140, 148 may, for example, host infrastructure equipment, such as computing systems, networking and storage systems, redundant power supplies, and environmental controls. In some examples, a service provider network that couples resources to one or more of nodes 132, 140, 148 may be coupled to one or more networks administered by other providers, and may thus form part of a large-scale public network infrastructure, e.g., the Internet. In the example of FIG. 1B, nodes 132, 140, 148 may include one or more physical or virtual resources (e.g., compute resources, network device resources, storage resources).

In some examples, distributed computing system 100 may represent a geographically distributed system. Distributed computing system 100 may include facilities that provide network services for customer devices (e.g., one or more client devices 101), which may be, e.g., devices of entities such as enterprises and governments or individuals. For example, distributed computing system 100 may host web services for several enterprises and end users. Other example services may include data storage, virtual private networks, traffic engineering, file service, data mining, scientific- or super-computing, and so on. In some cases, distributed computing system 100, which includes nodes 132, 140, 148, may include individual network servers, network peers, or otherwise.

In various examples, distributed computing system 100, which includes nodes 132, 140, 148, may include or provide a set of storage systems and application servers (e.g., one or more of devices 117 shown in FIG. 1A), which are interconnected via an Internet protocol (IP) fabric, and which may comprise a fabric provided by one or more tiers of physical network devices, such as, for example, routers, gateways, switches, hubs, modems, bridges, repeaters, multiplexers, servers, virtual machines running on one or more of the same, and other example network devices. FIG. 1A illustrates one example fabric 115. The IP fabric may be part of one or more network resources provided by distributed computing system 100. In certain examples, the IP fabric may include three tiers of devices: one or more spine devices, one or more aggregation devices, and one or more leaf devices. Other topologies may be used in other examples. The servers may provide execution and storage environments for applications and data associated with customer devices and may be physical servers, virtual machines or combinations thereof.

One or more client devices 101 may be communicatively coupled distributed computing system 100, such as via scalable telemetry control plane 102 (e.g., via dashboard services 104 and/or controller services 112, as described in further detail below). Scalable telemetry control plane 102 (referred to herein as "control plane 102") comprises various services that may be implemented or otherwise provided on one or more of nodes 132, 140, 148. For example, if node 132 comprises a controller node, one or more of services of control plane 102 may be provided by node 132. However, in certain cases, one of more of these services may also be provided by other nodes in distributed computing system 100, such as nodes 140, 148. As noted earlier, each of nodes 132, 140, 148 may comprise one or more physical devices (e.g., computing devices, server devices, client devices), virtual devices (e.g., virtual machines), or other entities. Although nodes 132, 140, 148 are shown in FIG. 1B, distributed computing system 100 may include any number of nodes within the cluster, and well as any number of collectors.

As shown in FIG. 1B, each of nodes 132, 140, 148 is communicatively coupled to a respective collector 138, 146, 154. For instance, collector 138 is communicatively coupled to node 132, collector 146 is communicatively coupled to node 140, and collector 154 is communicatively coupled to node 148. Collectors 138, 146, 154 may be examples of collectors 123 shown in FIG. 1A. In some cases, any given collector 138, 146, 154 may be part of or otherwise included in the respective node 132, 140, 148. In other cases, any given collector 138, 146, 154 may be external from yet communicatively coupled to the respective node 132, 140, 148. In these cases, a collector may be included in any other node (e.g., computing node) within distributed computing system 100.

In various examples, collectors 138, 146, 154 may comprise software agents or applications that are executable to collect, aggregate, and/or correlate data (e.g. traffic flow data) that is received from a respective node 132, 140, 148, such as when one or more of these nodes comprise network device nodes. The phrase "traffic flow data" may be used herein to describe data that includes either collected traffic flow data or aggregated traffic flow data. Collectors 138, 146, 154 may be configured to receive or otherwise capture, e.g., packet from one or more links into an individual node (e.g., a network device node) and compute flow statistics indicative of packet flow over the one or more links. For example, the traffic flow modules of one or more of collectors 138, 146, 154 may maintain traffic flow data associated with, e.g., a packet count, a byte count, a source Internet Protocol (IP) address, a destination IP address, a next hop IP address, input interface information, output interface information, total octets sent, flow start time, flow end time, source and destination port numbers, TCP flags, IP type of service, originating Autonomous System (AS), source address prefix mask bits, destination address prefix mask bits, or the like, for each packet flow. Collectors 138, 146, 154 may, in some examples, provide accounting capabilities for maintaining accurate flow statistics for all of the packets received by the collectors. Statistics for particularized packet flows can be maintained to a level of granularity desired for effective traffic analysis including aggregation of traffic flow data.

As shown in FIG. 1B, control plane 102 includes various different services that are provided at the platform level. As shown, control plane 102 includes one or more dashboard services 104, an optional orchestration platform service 108, one or more controller services 112, a data manager service 116, a database service 120, one or more adapter services 124, and a message service 128. In some cases, optional orchestration platform service 108 may be part of or included in another engine, such as orchestration engine 129 shown in FIG. 1A.

Each of these services shown in FIG. 1B may include or be associated with one or more pods, where each pod is capable of executing one or more corresponding applications or functions within the respective pod. In certain cases, a pod may encapsulate or include one or more application containers that are associated with a particular instance of an application that is executing on a node.

For example, and as described in further detail below, dashboard services 104 include one or more pods 106 that provide corresponding dashboard applications or functions; orchestration platform service 108 includes one or more pods 110 that provide corresponding orchestration applications or functions; controller services 112 include one or more pods 114 that provide corresponding controller applications or functions; data manager service 116 includes one or more pods 118 that provide corresponding data management applications or functions; database service 120 includes one or more pods 122 that provide corresponding database applications or functions; adapter services 124 include one or more pods 126 that provide corresponding adapter applications or functions; and message service 128 includes one or more pods 130 that provide corresponding messaging applications or functions.

As described previously, one of nodes 132, 140, 148 may serve as a master or controller node, and respective pods of one or more of services 104, 108, 112, 116, 120, 124, 128 of control plane 102 may be provided or implemented on this control node. In addition, respective pods of one or more of services 104, 108, 112, 116, 120, 124, 128 of control plane 102 may, in some cases, be provided or implemented on other nodes of distributed computing system 100.

For example, as shown in FIG. 1B, node 132 provides one or more services 134, which include one or more corresponding pods 136. If node 132 comprises a controller node, services 134 may include one or more of services 104, 108, 112, 116, 120, 124, 128 of control plane 102, and pods 136 may include one or more pods that correspond to these services. For instance, services 134 provided by node 132 may include dashboard services 104 of control plane 102, such that pods 136 on node 132 include one or more of pods 106 that provide corresponding applications or functions for these dashboard services. Similarly, services 134 of node 132 may include any one or more of orchestration platform service 108, controller services 112, data manager service 116, database service 120, adapter services 124, and/or message service 128, while pods of node 132 may include any one or more corresponding ones of pods 110, 114, 118, 122, 126, and/or 130.

As noted above, if node 132 comprises a controller node, any other of nodes within distributed computing system 100, such as nodes 140 and/or 148, may also optionally provide one or more of services 104, 108, 112, 116, 120, 124, 128 or corresponding pods 106, 110, 114, 118, 122, 11 (e.g., when control plane 102 is deployed in a high-availability mode, as described in further detail below). Thus, as shown in FIG. 1B, node 140 of distributed computing system 100 may optionally include one or more services 142 with one or more corresponding pods 144. Similarly, node 148 may optionally provide one or more services 150 with one or more corresponding pods 152.

According to various examples, control plane 102 may sit on top of, or operate in conjunction with, an orchestration platform (e.g., container orchestration platform) that is provided by orchestration platform service 108. As noted above, in some cases, orchestration platform service 108 may be provided by or included in orchestration engine 129 shown in FIG. 1A. Control plane 102 may comprise a single pane for configuration and data retrieval within distributed computing system 100 through implementation of services 104, 108, 112, 116, 120, 124, and 128.

In some examples, control plane 102 may be deployed in a single-node mode. In this mode, services 104, 108, 112, 116, 120, 124, and 128 of control plane 102 may all be deployed on a single controller node (e.g., node 132), and may communicate with each other during operation. However, in other examples, control plane 102 may be deployed in a high-availability mode, where the number of pods in each service may scale up depending on the respective service's requirements and/or the number of nodes in distributed computing system 100. In certain examples, input from client devices 101 may select or determine the type of deployment mode. In some examples, orchestration platform service 108 may select or determine the type of deployment mode (e.g., based on pre-existing or configured rules for control plane 102).

This high-availability deployment mode creates a scalable and more fault-tolerant design for control plane 102. In this mode, any services of control plane 102 that are in active-passive mode may have a single active pod on a node of distributed computing system 100, which will be replaced by another pod if the active pod goes down. Services that are in active-active mode may have a pod on each node of distributed computing system 100, such that control plane 102 will scale (e.g., horizontally) with the addition of any new nodes within the node cluster included in distributed computing system 100. An orchestration platform, such as one provided by orchestration platform service 108, may be leveraged to spin up or instantiate pods as needed in case of any pods going down or being terminated, as part of the fault-tolerant design. The number of pods for each of services 104, 108, 112, 116, 120, 124, and 128 may depend on type of service as well as the deployment mode of control plane 102 (e.g., single node or high availability, as described above). According to certain examples, the single node and high-availability deployment models may be the same, where the number of nodes specified in the deployment may be configurable. This approach may result in a simpler deployment model as there are not separate entry points for single node versus high-availability deployments.

In various examples, controller services 112 may comprise the central components for handling control operations within control plane 102. For example, controller services 112 may handle the onboarding and distribution of nodes (e.g. network device nodes, compute nodes) within distributed computing system 100, as well as alarm configuration. Hosts (e.g., nodes) and instances (e.g., pods) may also be created in the platform of control plane 102 via controller services 112. Controller services 112 may, in some cases, provide an application programming interface (API) or user interface layer that client devices 101 and/or users of client devices 101 may interact with. In other cases, client devices 101 may interact with dashboard services 104 via one or more user interfaces and/or APIs, and dashboard services 104 may then communicate client requests to controller services 112.

Controller services 112 may also provide all configuration details for the visualization piece (e.g. with dashboard services), as well as for external applications. In addition to the control operations, controller services 112 may also provide additional baselining and/or analysis that is done for the telemetry collection that occurs in distributed computing system 100 (e.g., using data from collectors 138, 146, 154). This functionality may, in some cases, include machine learning and predictive analytics for the resources configured in the platform of control plane 102.

For instance, controller services 112 may perform analysis, machine learning, and other functions, and may further generate reports, notifications, and alarms based on such information. For instance, controller services 112 may analyze received and/or stored information and identify, based on information about internal processor metrics, one or more virtual machines or network device nodes that are operating in a manner that may adversely affect the operation of other virtual machines or network device nodes executing in system 100. Controller services 112 may, in response to identifying one or more virtual machines 119 operating in a manner that may adversely affect the operation of other virtual machines 119, generate one or more reports and notifications. Controller services 112 may alternatively, or in addition, raise an alarm that is output by dashboard services 104.

In some examples, controller services 112 and/or collectors 138, 146, 154 may continuously collect or analyze measurements of metrics for a node. For a particular alarm, controller services 112 and/or collectors 138, 146, 154 may aggregate samples according to a user-specified function (average, standard deviation, min, max, sum) and produce a single measurement for each user-specified interval. Controller services 112 and/or collectors 138, 146, 154 may compare each same and/or measurement to a threshold. In some examples, a threshold evaluated by an alarm or a policy that includes conditions for an alarm may be either a static threshold or a dynamic threshold. For a static threshold, controller services 112 and/or collectors 138, 146, 154 may compare metrics or raw data corresponding to metrics to a fixed value. For instance, controller services 112 and/or collectors 138, 146, 154 may compare metrics to a fixed value using a user-specified comparison function (above, below, equal). For a dynamic threshold, controller services 112 and/or collectors 138, 146, 154 may compare metrics or raw data correspond to metrics to a historical trend value or historical baseline for a set of resources.

As described previously, any of services of control plane 102 may be deployed in a single-node mode or a high-availability mode. In the single-node deployment mode, all of the services of control plane 102 are deployed on a single controller node (e.g., node 132). In a high-availability deployment mode, the services of control plane 102 may be deployed on more than one node. Controller services 112 may have one or more pods 114 that are deployed on node 132, 140, and/or 148 (e.g., as one or more of pods 136, 144, and/or 152). When deployed in a high-availability mode, controller services 112 may have a single pod designated for each controller service of services 112, because controller services 112 execute in an active-passive mode in a high-availability deployment, according to various examples. This single active pod may be deployed on a controller node (e.g., node 132) or on another node in distributed computing system 100.

For instance, if controller services 112 includes first and second controller services, as noted in the example above, the first controller service may have its own designated pod of pods 114 when it executes in an active-passive mode, and the second controller service may have its own designated pod of pods 114 when it executes in an active-passive mode. In the case that the active pod goes down, controller services 112 and/or orchestration platform service 108 may ensure that another pod comes up in its place. For example, controller services 112 and/or orchestration platform service 108 may instantiate a new pod for execution as an active pod on one of nodes 132, 140, or 148. In another example, controller services 112 may maintain a single pod on each of nodes 132, 140, 148, where only one such pod is active. If this active pod goes down, controller services 112 and/or orchestration platform service 108 may activate one of the previously inactive pods in the active-passive mode.

Message service 128 of control plane 102 is configured to be the primary message bus for communicating between services 104, 108, 112, 116, 120, 124, 128 of control plane 102. Message service 128 includes one or more corresponding pods 130 and enables inter-service communication using one or more communication protocols for sharing or communicating data. When deployed in the high-availability mode, message service 128 may utilize just a single active pod (e.g., on a controller node such as node 132) when operating in an active-passive mode.

Data manager service 116 may be the main component in control plane 102 for handling database operations with regards to real-time data. All collectors 138, 146, 154, are configured to report their collected data to data manager service 116. This service may write the received data to a database (e.g., time-series database) and/or to database service 120, and may publish the data to the message bus that is used for inter-service communication between services of control plane 102. Data manager service 116 may be the main service for real-time data writing and retrieval for the entire cluster of nodes within distributed computing system 100. In addition to this functionality, data manager service 116 also performs caching, data aggregation for the real-time data, and streaming of the data to dashboard services 104 over the message bus.

In some cases, data manager service 116 may receive, for example, raw metrics from one or more of collectors 138, 146, 154. In some cases, data manager service 116 may, alternatively or in addition, receive results of analysis performed by collectors 138, 146, 154 on raw metrics.

Data manager service 116 and its one or more pods 118 are configured to scale horizontally with nodes as they are added in distributed computing system 100. In various examples, data manager service 116 may operate in an active-active mode for high-availability deployment, and pods 118 of data manager service 116 may include an active pod on each of the nodes within distributed computing system 100 for such a deployment. For example, pods 136 of node 132 may include one of pods 118 of data manager service as an active data manager pod; pods 144 of node 140 may include one of pods 118 as an active pod; and pods 152 of node 148 may include one of pods 118 as an active pod.

Figure 5:
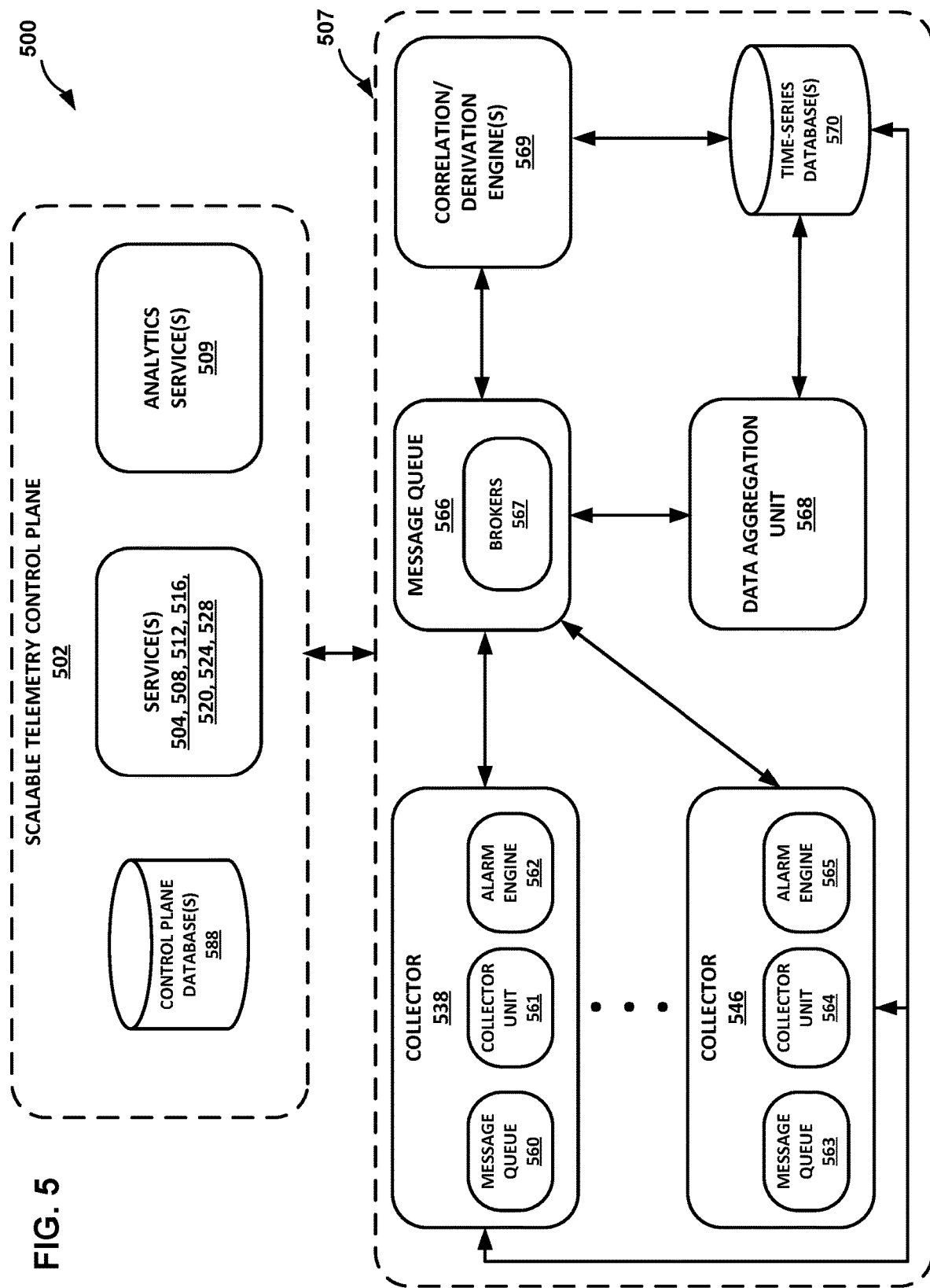
FIG. 5 is a block diagram illustrating further details of one example of the scalable telemetry control plane shown in FIG. 4, in accordance with one or more aspects of the present disclosure.

Database service 120 includes one or more pods 122 and serves as the database and/or service for both configuration and storage of real-time data in a control-plane database (e.g., time-series database 588), such as shown in FIG. 5. Database service 120 may interact with data manager service 116 during operation to handle configuration and data storage. Depending on the deployment mode, there might be multiple ones of pods 122 running for this service so that there is fault tolerance and also data replication. For example, in some examples, and similar to data manager service 116, database service 120 may operate in an active-active mode for high-availability deployment, and pods 122 of database service 120 may include an active pod on each of the nodes within distributed computing system 100 for such a deployment. In other cases, database service 120 may include only a single active pod on one of the nodes in distributed computing system 100 when database service 120 operates in an active-passive, high-availability mode.

Adapter services 124 include one or more pods 126 and are configured to handle discovery of devices, and/or any compute and/or network device resources that are associated with a node, within distributed computing system 100. For example, adapter services 124 may include a network device adapter that is configured to manage discovery of network devices. Such a network device adapter may communicate with one or more network device controller services (e.g., a network device controller service, which may or may not be part of controller services 112) to discover devices and configuration details such that controller services 112 may configure discovered resources in control plane 102. The network device adapter may discover the devices' connections (e.g., via the Link Layer Discovery Protocol, or LLDP), and may also discover communication interfaces for the onboarded devices.

Adapter services 124 may include other types of adapter components, as well. For instance, adapter services 124 may include an adapter (e.g., OpenStack adapter) that manages the discovery of certain types of resources, including hosts (e.g., nodes) and instances (e.g., pods). This type of adapter may communicate with controller services 112 or another controller (e.g., OpenStack controller) to discover available resources such that controller services 112 may configured discovered resources in control plane 102. This adapter may also collect metrics about, e.g. an OpenStack or Kubernetes cluster. For high-availability deployments, each service in adapter services 124 may include a single pod of pods 126 when operating in active-passive mode.

As noted earlier, control plane 102 also includes one or more dashboard services 104. Dashboard services 104 include one or more corresponding pods 106 and serves as the user interface for the cluster of nodes 132, 140, 148 included in distributed computing system 100. All configuration (e.g., configuration managed by controller services 112 and/or adapter services 124) may be visible via one or more graphical dashboards provided by dashboard services 104, and these graphical dashboards may provide visualizations of the for the cluster of nodes, along with a visual representation of corresponding real-time telemetry data and/or metrics for any given node, within distributed computing system 100. Data manager service 116 may perform caching and/or data aggregation for the real-time data provided by collectors 138, 146, 154, and may stream such data to dashboard services 104 over the message bus provided by message services 128. This data may be output by dashboard services 104 for visualization within the one or more graphical dashboards.

These dashboards may be displayed to users at client devices 101 that are communicatively coupled to dashboard services 104 of control plane 102. In some cases, dashboard services 104 may include a dashboard client and a dashboard server. The dashboard client may be instantiated on client devices 101 to process client requests from one or more users, and to output dashboard information and/or alarm information on client devices 101. The dashboard server may provide the applications and functionality to process requests or data received from the dashboard client and/or other services of control plane 102 and provide corresponding output to the dashboard client for client devices 101. Users of client devices 101 may send requests to dashboard services 104 to perform such tasks as onboarding nodes into distributed computing system 100, creating alarms, viewing charts for dashboards, and/or evaluating the performance of resources (e.g., nodes 132, 140, 148) via the dashboards. Dashboard services 104 may stream live, real-time data to the charts and alarms view and display the latest calculated health of the cluster with the dashboards that are output to client devices 101. When deployed in a high-availability mode, pods 106 may comprise a single pod during execution of dashboard services 104 (e.g., a single pod of pods 136 on node 132, such as when node 132 serves as a controller node).

In some cases, dashboards that are output by dashboard services 104 may provide information about resource allocations within distributed computing system 100. Resource allocations may, e.g., include static allocations of resources, such as vCPUs, floating IP addresses, and/or storage volumes, to list a few examples. In some examples, actual resource usage may be displayed within a dashboard for each instance in the project, and as the aggregate sum of usage by all instances in the project. Resource usage may show the actual physical resources consumed by an instance, such as CPU usage percentage, memory usage percentage, network I/O, and disk I/O. The cost charged for resource usage may be shown for each instance in the project. In addition, a cost breakdown by flavor type, and by resource type (Compute, Network, Storage) may be shown for the project as a whole, in certain examples.

Thus, control plane 102 comprises a scalable and common telemetry control plane across multiple different services within distributing computing system 100. As a result, the capabilities of all telemetry collectors 138, 146, 154 within distributed computing system 100 (e.g., compute node collectors, network device node collectors) may be controlled by this single control plane 102. Control plane 102 is responsible for onboarding and distributing nodes (e.g., network devices) to telemetry collectors 138, 146, 154. As one example, a user may use client devices 101 to send a request to dashboard services 104 or controller services 112 to onboard a network device via either a user interface (e.g. graphical user interface) or application programming interface (API) provided by dashboard services 104 and/or controller services 112. In some cases, the user may manually initiate this request at client devices 101 via a graphical user interface provided by dashboard services 104. In other cases, a user may interact with one or more applications executing on client devices 101, which send requests to dashboard services 104 and/or to controller services 112 via one or more APIs that are defined by control plane 102 to client devices 101.

Controller services 112 may handle requests for onboarding new nodes such as network device nodes or compute nodes. These requests may be provided by dashboard services 104 and/or by client devices 101 via one or more defined APIs. The onboarding of a new node such as a network device will typically involve obtaining the device's configuration information, such as the device's credentials, such that controller services 112 may connect the new node to distributed computing system 100, and such that the new node may communicate with other components/nodes/services/collectors/etc. of distributed computing system 100. Controller services 112 may manage this part of the onboarding process, in various examples, based on interaction with adapter services 124.

Adapter services 124 may discover the node and its configuration details and mark the node as staging. For example, adapter services 124 may discover compute and/or network device resources associated with the node (e.g., the interfaces and connection information for the node), such that controller services 112 may configure the new node for onboarding into distributed computing system 100. Any of the services of control plane 102, including controller services 112 and adapter services 124, may communicate over a message bus provided by message service 128.

As noted above, adapter services 124 may be configured to discover one or more compute resources and/or network device resources (e.g., connections, interfaces) for the node. In some cases, based on the discovered resources for the node, controller services 112 may either identify an existing telemetry collector or instantiate a new telemetry collector, and assign or otherwise associate this collector with the node. Controller services 112 are capable of assigning any of the onboarded nodes into distributing computing system 100 to respective compute node collectors or network device node collectors, depending on the type of each of the onboarded nodes and/or the resources associated with each of these nodes.

For example, as noted above, the new node may be a compute node or a network device node. If the new node is a compute node, based on the one or more compute resources that are discovered by adapter services 124, controller services 112 may assign the node to a compute node collector. In some examples, controller services 112 may either identify an existing compute node collector that executes on another compute node within distributed computing system 100, or controller services 112 may instantiate a new compute node collector for execution on the node itself.

If the new node, however, is a network device node, based on the one or more network device resources that are discovered by adapter services 124, controller services 112 may assign the node to a network device node collector. In some examples, controller services 112 may either identify an existing network device node collector that executes on another node (e.g., compute node) within distributed computing system 100, or controller services 112 may instantiate a new network device node collector for execution on another node (e.g., compute node) within distributed computing system 100. For example, controller services 112 may identify a pool of currently existing network device node collectors that are executing on one or more other nodes of distributed computing system 100. Each of these existing network device node collectors may be currently assigned to, and collect telemetry data from, one or more other network device nodes in distributed computing system 100. In some cases, controller services 112 may select one existing network device node collector from this pool and assign it to the new node. For instance, controller services 112 may implement a rule or policy to select an existing network device node collector that is the least-loaded collector from the pool and/or that is currently assigned to the fewest number of other network device nodes in distributed computing system 100. In such fashion, controller services 112 may provide a load-balancing policy when assigning network device nodes to existing network device node collectors in the existing pool.

In some cases, controller services 112 may provide, to the collector that is assigned to the node, information about the compute resources or network resources that were discovered by adapter services 124. The assigned collector may use such information to further configure the node to initiate the collection of telemetry data for the node, which may be gathered by the collector, based on the discovered resources and/or capabilities of the node. In some cases, controller services 112 may also initially configure the collector for use in distributed computing system 100. For instance, controller services 112 may send one or more identifiers to the collector that may be used by the collector during execution (e.g., an identifier of the node that is assigned to the collector and/or an identifier assigned to the collector for use during execution in distributed computing system 100). Controller services 112 may also send, to the collector, one or more identifiers of services with which the collector will interact during execution (e.g., an identifier of controller services 112, data manager service 116, or any other service of control plane 102).

In one example, once controller services 112 has configured the new node (e.g., new network device) and stored any information about the node, controller services 112 may identify or instantiate a collector, and distribute or otherwise associate the node to this collector. For example, in FIG. 1B, if node 140 is the new node that is onboarded by controller services 112, controller services 112 may identify or instantiate collector 146, and distribute or otherwise associate new node 140 to this collector 146. Collector 146 may execute on any node within distributed computing system 100, and therefore may or may not execute directly on node 140.

In any case, however, collector 146 is associated with node 140 in this example, and collector 146 may configure node 140, as appropriate, and begin collecting real-time telemetry data from node 140. Collector 146 may stream this live, real-time telemetry data to data manager service 120. For example, data manager service 116 may be one of services 142 executing on node 140, and one of pods 144 executing on node 140 may comprise one of pods 118 of data manager service 116. Data manager service 116 may then stream the real-time telemetry data to dashboard services 104 for the data visualization.

Once the new node (e.g., node 140) device has been successfully onboarded via control plane 102, dashboard services 104 is configured to provide a visualization of the configured node, including a visualization of the real-time telemetry data collected for the node. The charts of the dashboard may, for example showcase the live real-time data being collected from collector 146 associated with the newly onboarded node, and the infrastructure view may, in some cases, display the calculated health of the onboarded node. Configured alarms may also be displayed on the dashboard output to client devices 101. For example, the user can use client devices 101 to interact with dashboard services 104 to create alarms for the newly onboarded node via the dashboard that is output by dashboard services 104.

As a result, the presently disclosed techniques provide an implementation framework that results in an elastic, highly scalable design that may also leverage an orchestration platform (e.g. orchestration platform service 108) to create a single group of services for control plane 102, as illustrated in FIG. 1B. With such a single control plane design, the deployment model becomes simpler, as well as the user interaction therewith, since there is a single, virtual "pane of glass" provided by control plane 102 with respect to across all types of data collection within a cluster of nodes 132, 140, 148 for distributed computing system 100.

Figure 2:
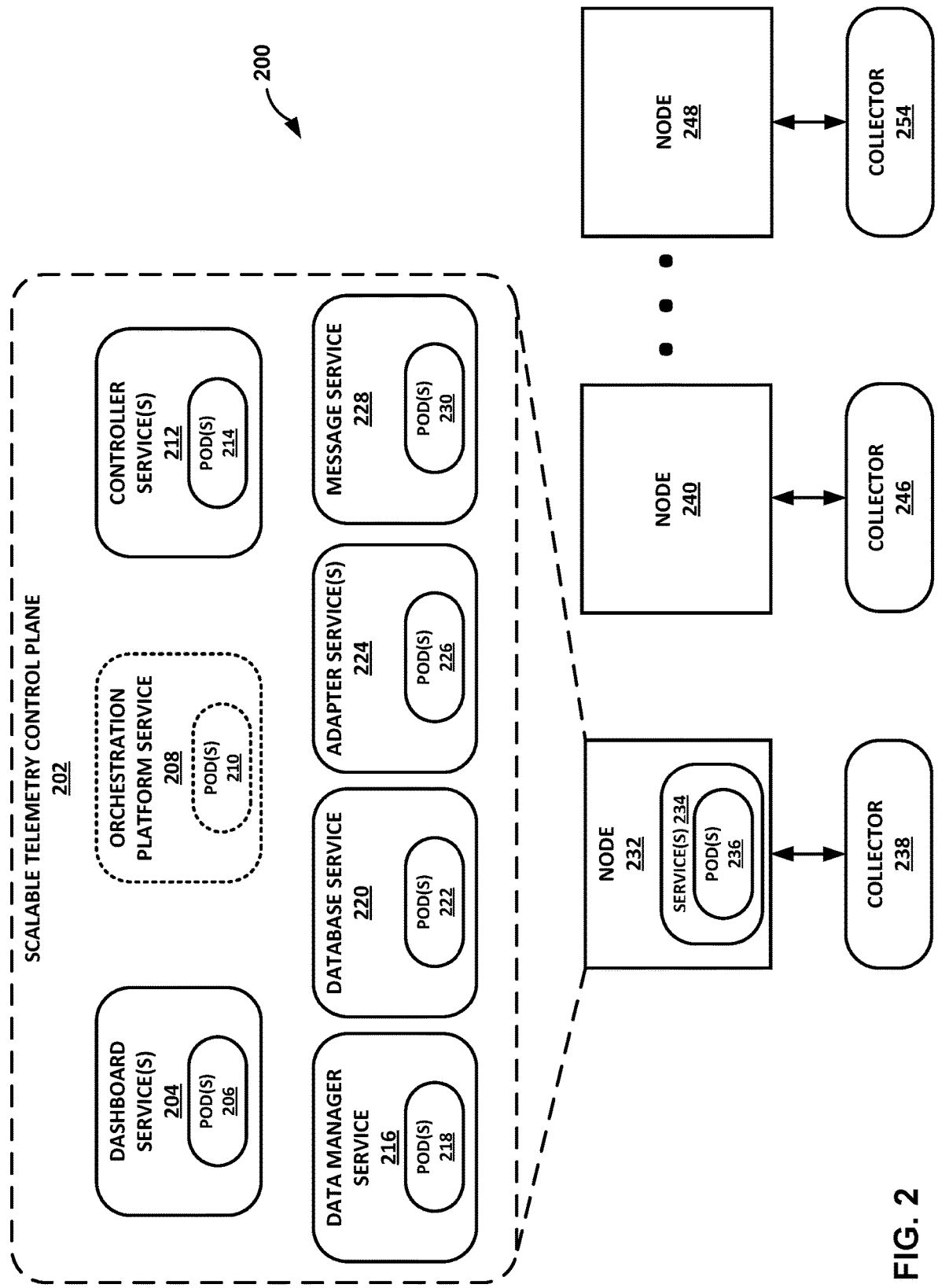
FIG. 2 is a block diagram illustrating one example of a scalable telemetry control plane for a single node deployment, in accordance with one or more aspects of the present disclosure.

FIG. 2 is a block diagram illustrating one example of a scalable telemetry control plane 202 for a single node deployment within distributed computing system 200, in accordance with one or more aspects of the present disclosure. Control plane 202 is just one example of control plane 102 shown in FIGS. 1A-1B. Components shown in FIG. 2 may have functionality that is similar to components in FIGS. 1A-1B with similar reference numerals. Although not shown in FIG. 2, control plane 202 may be communicatively coupled to one or more external client devices (e.g., client devices 101 shown in FIGS. 1A-1B).

Similar to control plane 102, control plane 202 of FIG. 2 includes one or more dashboard services 204, orchestration platform service 208, controller services 212, data manager service 216, database service 220, adapter services 224, and message service 228. These services provide functionality that is similar to that described above in reference to control plane 102 in FIGS. 1A-1B. Thus, dashboard services 204 includes one or more pods 206, orchestration platform service 208 includes one or more pods 210, controller services 212 includes one or more pods 214, data manager service 216 includes one or more pods 218, database service 220 includes one or more pods 222, adapter services 224 includes one or more pods 226, and message service 228 includes one or more pods 230.

Similar to distributed computing system 100 of FIG. 1B, distributed computing system 200 includes one or more nodes 232, 240, and 248. In the example of FIG. 2, node 232 includes or is otherwise communicatively coupled to collector 238, node 240 includes or is otherwise communicatively coupled to collector 246, and node 248 includes or is otherwise coupled to collector 254. Although only three nodes and three corresponding collectors are shown in FIG. 2, distributed computing system 200 may include any number of such nodes or collectors.

As described above in reference to FIG. 1B, in some examples such as illustrated in FIG. 2, control plane 202 may be deployed in a single-node mode (e.g., based on input from the user or client devices 101 shown in FIG. 1B and/or based on input from orchestration platform service 208 according to pre-existing or configured rules for control plane 202). In this mode, services 204, 208, 212, 216, 220, 224, and 228 of control plane 202 may all be deployed on a single controller node (e.g., node 232), and may communicate with each other during operation. The number of pods for each of services 204, 208, 212, 216, 220, 224, and 228 may depend on type of service as well as the deployment mode of control plane 202 (e.g., single node deployment in the example of FIG. 2).

For the single node deployment model, node 232 of FIG. 2 may serve as a controller node. Each of the other nodes in distributed computing system 200 may be communicatively coupled to node 232. In the single node deployment model of FIG. 2, all of the services of control plane 202 are executed by node 232. Thus, services 234 of node 232 include dashboard services 204, orchestration platform service 208, controller services 212, data manager service 216, database service 220, adapter services 224, and message service 228. The corresponding pods for these services are therefore also executed on node 232.

Thus, pods 236 include one or more pods 206 of dashboard services 204, one or more pod's 210 of orchestration platform service 208, one or more pods 214 of controller services 212, one or more pods 218 of data manager service 216, one or more pods 222 of database service 220, one or more pods 226 of adapter services 224, and one or more pods 230 of message service 228. If any of pods 236 go down (e.g. are terminated) at any point in time, orchestration platform service 208 is capable of instantiating new pods for corresponding services on node 232. However, in alternate examples, the services of the control plane may be deployed in a high-availability mode (e.g., based on input from the user or client devices 101 shown in FIG. 1B), such as illustrated in FIG. 3.

Figure 3:
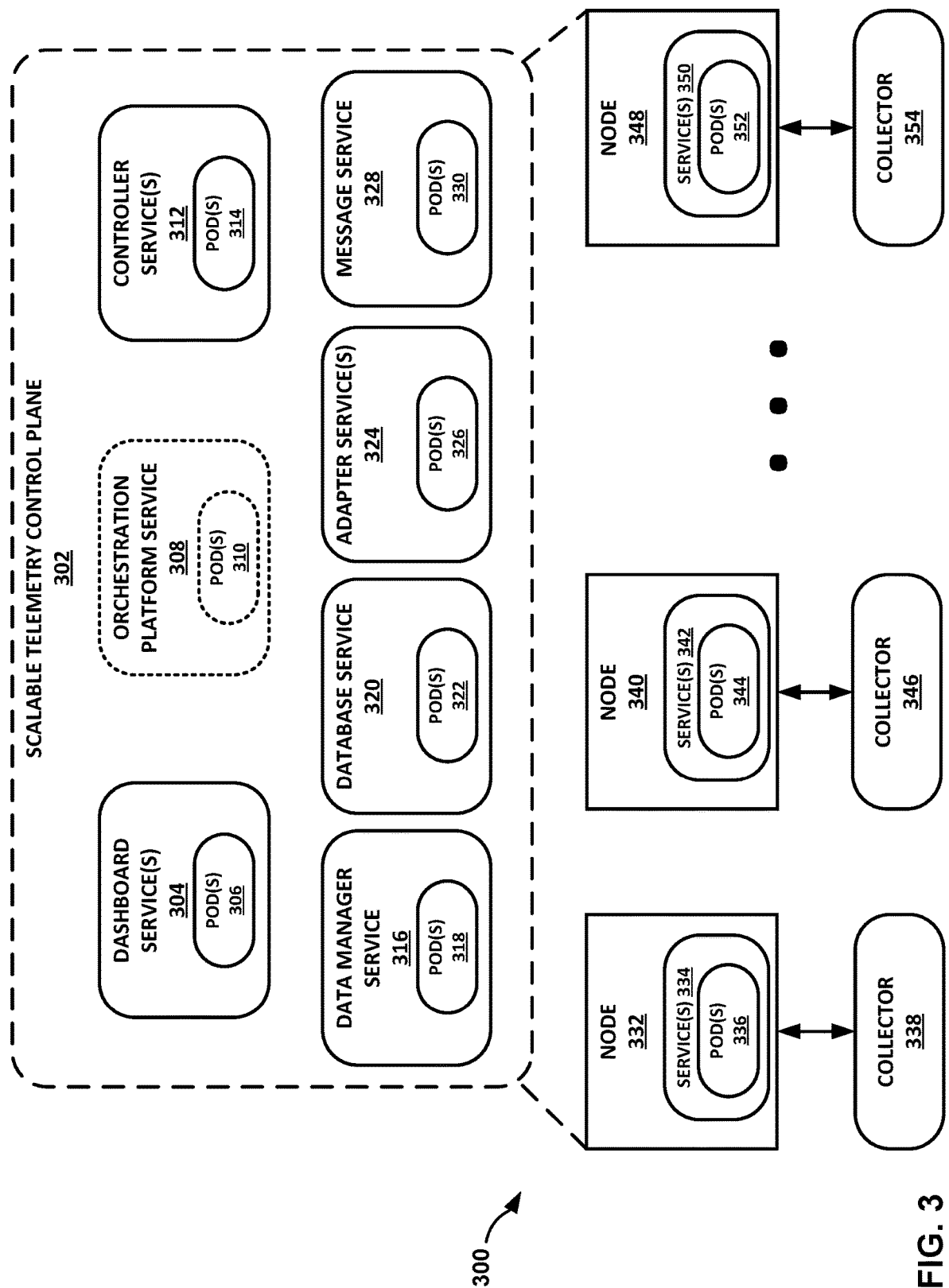
FIG. 3 is a block diagram illustrating one example of a scalable telemetry control plane for a high-availability (HA) deployment, in accordance with one or more aspects of the present disclosure.

FIG. 3 is a block diagram illustrating one example of a scalable telemetry control plane for a high-availability (HA) deployment, in accordance with one or more aspects of the present disclosure. Control plane 302 is just one example of control plane 102 shown in FIGS. 1A-1B. Components shown in FIG. 3 may have functionality that is similar to components in FIGS. 1A-1B with similar reference numerals. Although not shown in FIG. 3, control plane 302 may be communicatively coupled to one or more external client devices (e.g., client devices 101 shown in FIGS. 1A-1B).

Similar to control plane 102, control plane 302 of FIG. 2 includes one or more dashboard services 304, orchestration platform service 308, controller services 312, data manager service 316, database service 320, adapter services 324, and message service 328. These services may provide functionality that is similar to that described above in reference to control plane 102 in FIG. 1B. Thus, dashboard services 304 includes one or more pods 306, orchestration platform service 308 includes one or more pods 310, controller services 312 includes one or more pods 314, data manager service 316 includes one or more pods 318, database service 320 includes one or more pods 322, adapter services 324 includes one or more pods 326, and message service 328 includes one or more pods 330.

Similar to distributed computing system 100 of FIG. 1B, distributed computing system 300 includes one or more nodes 332, 340, and 348. In the example of FIG. 3, node 332 includes or is otherwise communicatively coupled to collector 338, node 340 includes or is otherwise communicatively coupled to collector 346, and node 348 includes or is otherwise coupled to collector 354. Although only three nodes and three corresponding collectors are shown in FIG. 3, distributed computing system 3200 may include any number of such nodes or collectors.

As described above in reference to FIG. 1B, in some examples such as illustrated in FIG. 3, control plane 302 may be deployed in a high-availability mode. In some cases, control plane 302 is configured to deploy in such a high-availability mode based on input from the user or a client device (e.g., client devices 101 shown in FIG. 1B). In some examples, orchestration platform service 108 may select or determine the type of deployment mode for control plane 302 (e.g., based on pre-existing or configured rules for control plane 102).

In the high-availability mode, the number of pods in each service may scale up depending on the respective service's requirements and/or based on the number of currently existing nodes in distributed computing system 300. This high-availability deployment mode creates a scalable and fault-tolerant design for control plane 302. In this mode, any services of control plane 302 that are in active-passive mode may have a single active pod in distributed computing system 300, which will be replaced (e.g., by orchestration platform service 308) with another pod if the active pod goes down. Services that are in active-active mode will have a pod per node of distributed computing system 300, such that control plane 302 will scale (e.g., horizontally) with the cluster of nodes as individual nodes are added to or removed from distributed computing system 300.

An orchestration platform, such as one provided by orchestration platform service 308, may be leveraged to spin up or instantiate new pods as needed in case of any existing pods going down or being terminated, as part of the fault-tolerant design. The number of pods for each of services 304, 308, 312, 316, 320, 324, and 328 may depend on type of service. According to certain examples, the high-availability deployment of FIG. 3 may be similar to or the same as the single node deployment shown in FIG. 2; only the number of nodes specified in the deployment may be configurable.

In the high-availability deployment mode illustrated in the example of FIG. 3, the services of control plane 302 may be deployed on more than one node. However, certain services may only include a single active pod at a time (e.g., when such services are deployed in active-passive mode). For example, when a given service of control plane 302 is deployed in active-passive mode, this service may include one of its pods on each of nodes 332, 340 348, but only one of these pods is active at any given time. If this pod goes down, another pod on another node is transitioned from a passive to an active state. In other examples, this given service may include only one pod on one of the nodes of distributed computing system 300, which is the active pod for this service. If the active pod goes down, the service and/or orchestration platform service 308 may instantiate a new active pod on the fly.

With respect to the services shown in FIG. 3, when control plane 302 is deployed in a high-availability mode, controller services 312 may have a single active pod designated for each controller service of services 312, because controller services 312 execute in an active-passive mode in a high-availability deployment, according to various examples. Any single active pod may be deployed on a controller node (e.g., node 132) or on another node in distributed computing system 300.

For instance, if controller services 312 includes first and second controller services, as noted in the example above, the first controller service may have its own designated pod of pods 314 when it executes in an active-passive mode, and the second controller service may have its own designated pod of pods 314 when it executes in an active-passive mode. In the case that the active pod goes down, controller services 312 and/or orchestration platform service 308 may ensure that another pod is activated and/or comes up in its place. For example, controller services 312 and/or orchestration platform service 308 may instantiate a new pod for execution as an active pod on one of nodes 332, 340, 348. In another example, and as described above, controller services 312 may maintain a single pod on each of nodes 332, 340, 348, where only one such node pod is active. If this pod goes down, controller services 312 and/or orchestration platform service 308 may activate one of the previously inactive pods in the active-passive mode.

One or more of the services of control plane 302 may operate in active-active mode when control plane 302 is deployed in high-availability mode. For instance, data manager service 316 and/or database service 320 may operate in active-active mode. In this case, each respective service may have an active pod on each of the nodes in distributed computing system 300. Thus, if data manager service 316 operates in this active-active mode, it will may execute, and include an instantiation of one of its pods 318, on each of nodes 332, 340, and 348. As illustrated in FIG. 3, services 334 that execute on node 332 may include data manager service 316, and pods 336 of node 332 may include one of data manager service pods 318. Similarly, services 342 that execute on node 340 may include data manager service 316, and pods 344 of node 340 may include one of data manager service pods 318. Services 350 that execute on node 348 may also include data manager service 316, and pods 352 of node 348 may include one of data manager service pods 318. As a result of this implementation, when the deployment is a high-availability deployment, the number of pods for the various services of control plane 302 may scale according to the size or number of nodes within distributed computing system 300, creating a scalable and more fault-tolerant design.

In some cases, distributed computing system 300 may also scale its services, such as data manager service 316 and/or database service 320, when nodes are removed from distributed computing system 300. For example, a user may use client devices 101 to send a request to remove node 348 from distributed computing system 300 (e.g., if node 348 has been terminated or shut down). In this case, dashboard services 304 or controller services 312 may receive the request. The information regarding node 348 may be removed from a database of control plane 302 (e.g., control plane database 588 shown in FIG. 5), and dashboard services 304 may update the visual display information (e.g., dashboard) that is output for display to indicate that node 348 has been removed. Any services 350 and pods 352 that were previously executed on node 348 (e.g., one of data manager pods 318 and/or one of database pods 322) are terminated. Thus, the design of control plane 302 also enables scaling of its services and pods as different nodes are either added to or removed from distributed computing system 300.

Figure 4:
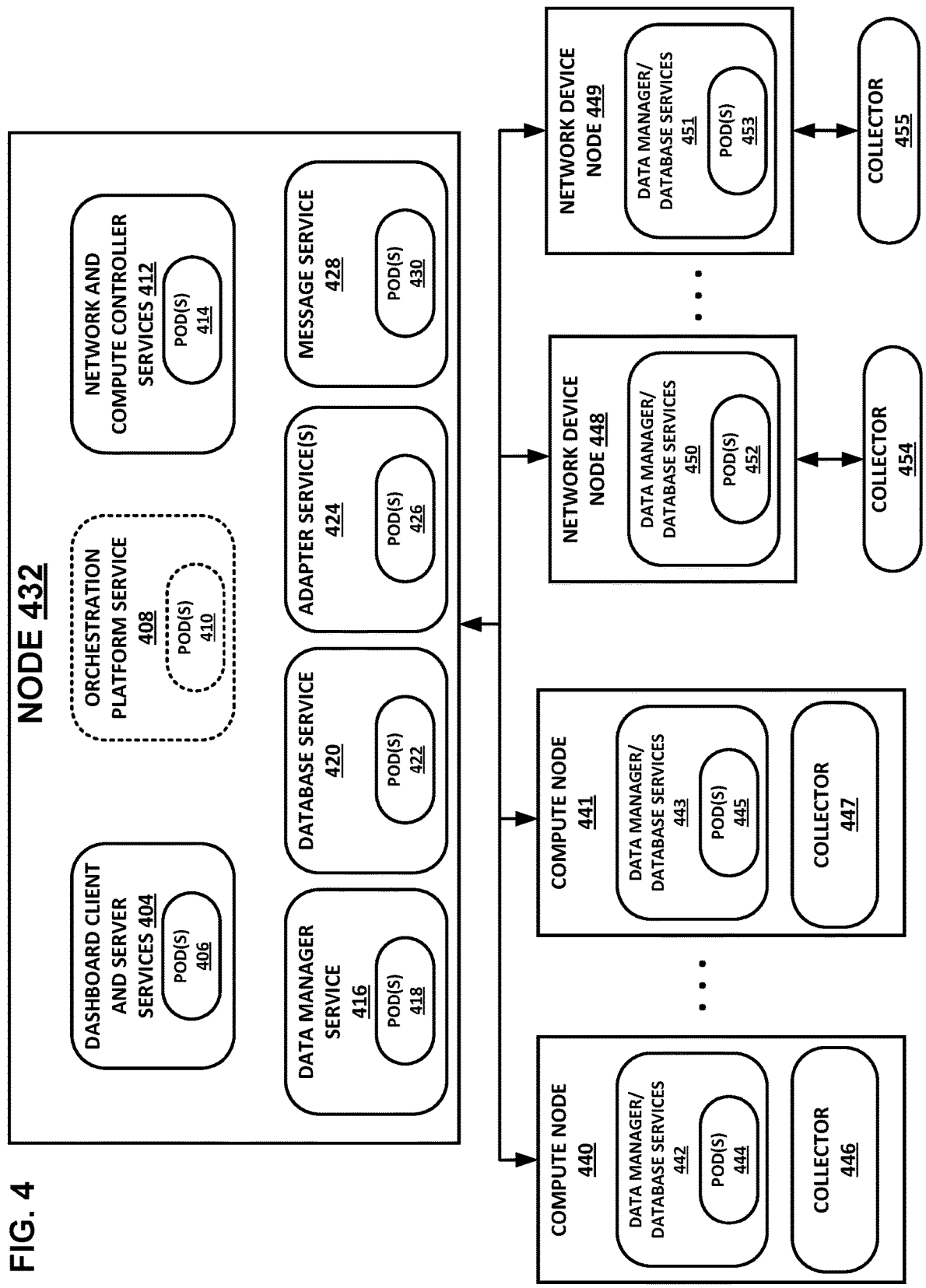
FIG. 4 is a block diagram illustrating one particular example of the scalable telemetry control plane shown in FIG. 3, in accordance with one or more aspects of the present disclosure.

FIG. 4 is a block diagram illustrating one particular example of the scalable telemetry control plane shown in FIG. 3, in accordance with one or more aspects of the present disclosure. In FIG. 4, for purposes of illustration, an example group of nodes 432, 440, 4441, 448, and 449 are shown. These nodes may be part of a distributed computing system, such as system 300 shown in FIG. 3. In the example of FIG. 4, two of these nodes may comprise compute nodes 440, 441 and two of the nodes may comprise network device nodes 448, 449. However, in other examples, any number of nodes my be included in the system.

The control plane of FIG. 4 is deployed in a high-availability mode. Various services of the control plane are instantiated for executed on node 432, which comprise a controller node. Thus, as illustrated in FIG. 4, controller node 432 includes dashboard client and services 404, orchestration platform service 408, network and compute controller services 412, data manager service 416, database service 420, adapter services 424, and message service 428.

Dashboard client and server services 404 is one example of dashboard services 304 shown in FIG. 3. Dashboard client and server services 404 include a dashboard client and a dashboard server. The dashboard client may be instantiated on or otherwise interface with a client device (e.g., client devices 101) to handle client requests from one or more users of the client device. The dashboard server may provide the applications and functionality to process data received from the dashboard client or other services of the control plane, and provide corresponding output for the dashboard client, such as dashboard information and/or alarm information. Dashboard client and server services includes one or more pods 406. In some examples, dashboard client and server services 404 may include a single active pod (e.g., where pods 406 includes only a single active pod) while operating in an active-passive mode.

Orchestration platform service 408 is one example of orchestration platform service 308. Orchestration platform service 408 includes one or more pods 410. In some examples, orchestration platform service 408 includes a single active pod of pods 410 while operating in an active-passive mode.

Network and compute controller services 412 is one example of controller services 312. Network and compute controller services 412 may include a network controller service and a compute controller service. The network controller service may provide functionality described above with respect to controller services 312 for onboarding network device nodes (e.g., network device nodes 448 and 449) within the distributed computing system of FIG. 4. The compute controller service may provide functionality described above with respect to controller services 312 for onboarding compute nodes (e.g., compute nodes 440 and 441) with the distributed computing system. In some examples, network and compute controller services 412 include a single active pod of pods 414, for each of the network controller and the compute controller, while operating in an active-passive mode.

Data manager service 416 is one example of data manager service 316 shown in FIG. 3. Data manager service 416 includes one or more pods 418. In some examples, data manager service 416 will have an active pod of pods 418 resident on each of the other nodes in the distributed computing system while operating in an active-active mode. Database service 420 is one example of database service 320 and includes one or more pods 422. In some examples, database service 420 will have an active pod of pods 422 resident on each node while operating in an active-active mode.

For instance, in the example of FIG. 4, the distributed computing system includes controller node 432, a first compute node 440, a second compute node 441, a first network device node 448, and a second network device node 449. It is assumed that network and compute controller services 412 has previously onboarded nodes 440, 441, 448, and 449 and assigned each of them a corresponding telemetry collector. As shown, compute node 440 is assigned collector 446 (e.g., one example of collector 346 shown in FIG. 3), compute node 441 is assigned collector 447, network device node 448 is assigned collector 454, and network device node 449 is assigned collector 455. In some examples, one or more of the collectors may comprise one or more software agents.

Because data manager service 416 and/or database service 420 each may have an active pod of pods 418/pods 422 resident on each node while operating in an active-active mode, compute node 440 includes one or more data manager/database services 442 that include pods 444. Data manager/database services 442 may comprise instantiations of data manager service 416 and database service 420 onto compute node 440. Pods 444 may include instantiations of pods 418 and 422 onto compute node 440. Pods 444 include an active data manager pod and an active database pod for data manager/database services that execute on compute note 440. Similar to data manager service 316 and database service 320, data manager/database services 442 handle database operations with regards to real-time data, and process telemetry data that is collected and provided by collector 446.

Because the data manager and database services provide an active pod on each node, compute node 441, network device node 448, and network device node 449 include similar services and pods. As shown in FIG. 4, compute node 441 includes data manager/database services 443, which includes pods 445, and processes telemetry data provided by collector 447 assigned to compute node 441. Network device node 448 includes data manager/database services 450, which includes pods 452, and processes telemetry data provided by collector 454. Network device node 449 includes data manager/database services 451, which includes pods 453, and processes telemetry data provided by collector 455.

Similar to the description in earlier figures, adapter services 424 may be configured to discover one or more compute resources and/or network device resources (e.g., connections, interfaces) for a node. In some cases, based on the discovered resources for the node, controller services 412 may either identify an existing telemetry collector or instantiate a new telemetry collector, and assign or otherwise associate this collector with the node. Controller services 412 is capable of assigning any of the onboarded nodes into the distributing computing system to respective compute node collectors or network device node collectors, depending on the type of each of the onboarded nodes and/or the resources associated with each of these nodes.

For example, a new node may be a compute node or a network device node. If the new node is a compute node, and based on the one or more compute resources that are discovered by adapter services 424, controller services 412 may assign the node to a compute node collector. In some examples, controller services 412 may either identify an existing compute node collector that executes on another compute node within the system, or controller services 412 may instantiate a new compute node collector for execution on the node itself.

If the new node, however, is a network device node, and based on the one or more network device resources that are discovered by adapter services 424, controller services 412 may assign the node to a network device node collector. In some examples, controller services 412 may either identify an existing network device node collector that executes on another node (e.g., compute node) within the distributed computing system, or controller services 412 may instantiate a new network device node collector for execution on another node (e.g., compute node) within the system. For example, controller services 412 may identify a pool of currently existing network device node collectors that are executing on one or more other nodes of the system. Each of these existing network device node collectors may be currently assigned to, and collect telemetry data from, one or more other network device nodes. In some cases, controller services 412 may select one existing network device node collector from this pool and assign it to a new node. For instance, controller services 412 may implement a rule or policy to select an existing network device node collector that is the least-loaded collector from the pool and/or that is currently assigned to the fewest number of other network device nodes in the system. In such fashion, controller services 412 may provide a load-balancing policy when assigning network device nodes to existing network device node collectors in the existing pool.

In some cases, controller services 412 may provide, to the collector that is assigned to the node, information about the compute resources or network resources that were discovered by adapter services 424. The assigned collector may use such information to further configure the node to initiate the collection of telemetry data for the node, which may be gathered by the collector, based on the discovered resources and/or capabilities of the node. In some cases, controller services 412 may also initially configure the collector for use in the system. For instance, controller services 412 may send one or more identifiers to the collector that may be used by the collector during execution (e.g., an identifier of the node that is assigned to the collector and/or an identifier assigned to the collector for use during execution). Controller services 412 may also send, to the collector, one or more identifiers of services with which the collector will interact during execution (e.g., an identifier of controller services 412, data manager service 416, or any other service of control plane 402).

As noted above, in some cases, a collector assigned to a node may execute within that node. In other cases, a collector assigned to a node may execute on a separate node (e.g., on a separate compute node) and collect telemetry data from the assigned node. In the example of FIG. 4, compute nodes 440 and 441 execute or otherwise include the respective collectors 446 and 447. However, collectors 454 and 455 that are respectively assigned to network device nodes 448 and 449 are executed on separate nodes and are associated with network device nodes 448 and 449 by network and compute controller services 412. Thus, network and compute controller services 412 assign collector 454 to collect telemetry data from network device node 448, even though collector 454 may be instantiated on a separate node. Similarly, network and compute controller services 412 assign collector 455 to collect telemetry data from network device node 449.

Adapter services 424, as shown in FIG. 4, is one example of adapter services 324. Adapter services 424 includes one or more pods 426. In some examples, adapter services 424 includes a single active pod of pods 426 while operating in an active-passive mode.

Message service 428 is one example of message service 328. Message service 428 includes one or more pods 430. In some examples, message service 428 includes a single active pod of pods 430 while operating in an active-passive mode.

FIG. 5 is a block diagram illustrating further details of one example of the scalable telemetry control plane shown in FIG. 4, in accordance with one or more aspects of the present disclosure. For example, control plane 502 is one example of control plane 102 shown in FIGS. 1A-1B. Components shown in FIG. 5 may have functionality that is similar to components in FIGS. 1A-1B having similar reference numerals. Although not shown in FIG. 5, control plane 502 may be communicatively coupled to one or more external client devices (e.g., client devices 101 shown in FIGS. 1A-1B).

Control plane 502 may be deployed one or more nodes of a distributed computing system 500 in either a single-node or high-availability mode, as described previously. Control plane 502 includes one or more services 504, 508, 512, 516, 520, 524, and 528. If control plane 502 is deployed in a high-availability mode, each of these services may be deployed in active-active or active-passive mode. Similar to that described in prior figures, these services may include one or more dashboard services 504, an orchestration platform service 508, one or more controller service 512, a data manager service 516, a database service 520, one or more adapter services 524, and a message service 528. Each of these services may include one or more pods, as described previously.

Control plane 502 may also include one or more control plane databases 588 and one or more analytics services 509. Any of the services included in control plane 502 may interact with control plane databases 588 to read and/or write data during execution. For example, control plane databases may store one or more or node configuration data, real-time telemetry data, alarm configuration data, orchestration data, node discovery data, node message/communication data, and the like. Analytics services 509 may provide baselining and/or analysis functions that are performed for any telemetry collection that occurs in distributed computing system 500, which may, e.g., include machine learning and/or predictive analytics for resources configured in control plane 509. In some cases, analytics services 509 may provide one or more functions described earlier in reference to FIG. 1B performed by controller services 112. Similar to other services in control plane 502, analytics services 509 may include one or more pods. In some examples, the functionality of analytics services 509 may be included in controller services 512.

FIG. 5 also illustrates various other components included in distributed computing system 500. These include one or more collectors, such as collector 538 and 546, a message queue 566, a data aggregation unit 568, one or more correlation/derivation engines 569, and one or more time-series databases 570. These various components may be deployed on one or more nodes of distributed computing system, and may be communicatively coupled to control plane 502 during execution.

Similar to collectors shown and described in reference to prior figures, collectors 538 and 546 may be configured to collect real-time telemetry data from corresponding nodes within distributed computing system 500. In some cases, one or more of the collectors, such as collectors 538 and 546, may be executed on respective nodes for which they collect data, and in other cases, they may be executed on separate nodes.

The collectors may each include a message queue, a collector unit, and an alarm engine. For instance, as shown in FIG. 5, collector 538 includes a message queue 560, a collector unit 561, and an alarm engine 562. Collector 546 includes a message queue 563, a collector unit 564, and an alarm engine 565.

As one example, collector unit 561 may be configured to collect the real-time telemetry data from a corresponding node within distributed computing system 500. When collection data is ready, collector unit 561 may insert one or more messages into message queue 560 for processing by collector 538. For example, when collector unit 561 has collected real-time telemetry data, it may insert one or more messages into message queue 560 that include this data. Collector 538 may then process these messages from message queue 560 and send them to corresponding nodes, services, and/or pods within distributed computing system 500 (e.g., to data manager service 516 of control plane 502). Alarm engine 562 of collector 538 may also receive data from collector unit 561 and/or message queue 560 to generate one or more alarms that are triggered based on existing rules that are applied to the collected telemetry data. These rules may comprise default, pre-existing rules and/or rules that are customizable by a user. Any of message queue, collector unit 561, and/or alarm engine 562 may store information in time-series databases 570. In some cases, time-series databases 570 are separate from control plane databases 588 but may include certain shared data. In some cases, one or more of time-series databases 570 may be included in control plane databases 588.

In some cases, collector unit 561 may also provide one or more messages to an external message queue 566. Message queue 566 may be communicatively coupled to one or more collectors in distributed computing system 500, such as collectors 538 and 546. Message queue 566 includes one or more brokers 567 that may handle the brokering of data into (e.g., from collectors 538, 546) and/or out (e.g., to correlation/derivation engines 569) of message queue 566. Similar to message queue 560, message queue 566 may use brokers 567 to process messages from the queue and send them to other components within system 500.

For example, message queue 566 may send messages including telemetry data, provided by collectors 538 and/or 546, to data aggregation unit 568. Data aggregation unit 568 may aggregate, e.g., telemetry data from one or more of the collectors in distributed computing system 500, and store this aggregated data in databases 570.

Message queue 566 may also send one or more messages to correlation/derivation engines 569. Correlation/derivation engines 569 may be configured to ingest real-time telemetry data from collectors 538 and 546, as included in the messages from message queue 566. These correlation/derivation engines 569 may perform correlation and/or aggregation functions with respect to telemetry data that is received from groups of one or more collectors and calculate derived metrics. Correlation/derivation engines 569 may then store these derived metrics into time-series databases 570.

In some cases, when time-series databases 570 are not included in control plane databases 588, collectors 538/546, data aggregation unit 568, and/or correlation/derivation engines 569 may also provide information stored in time-series databases 570 to control plane 502 for processing. In certain cases, one or more services of control plane 502 (e.g., controller services 512, data manager service 516) may have access the information included in time-series databases 570.

Figure 6:
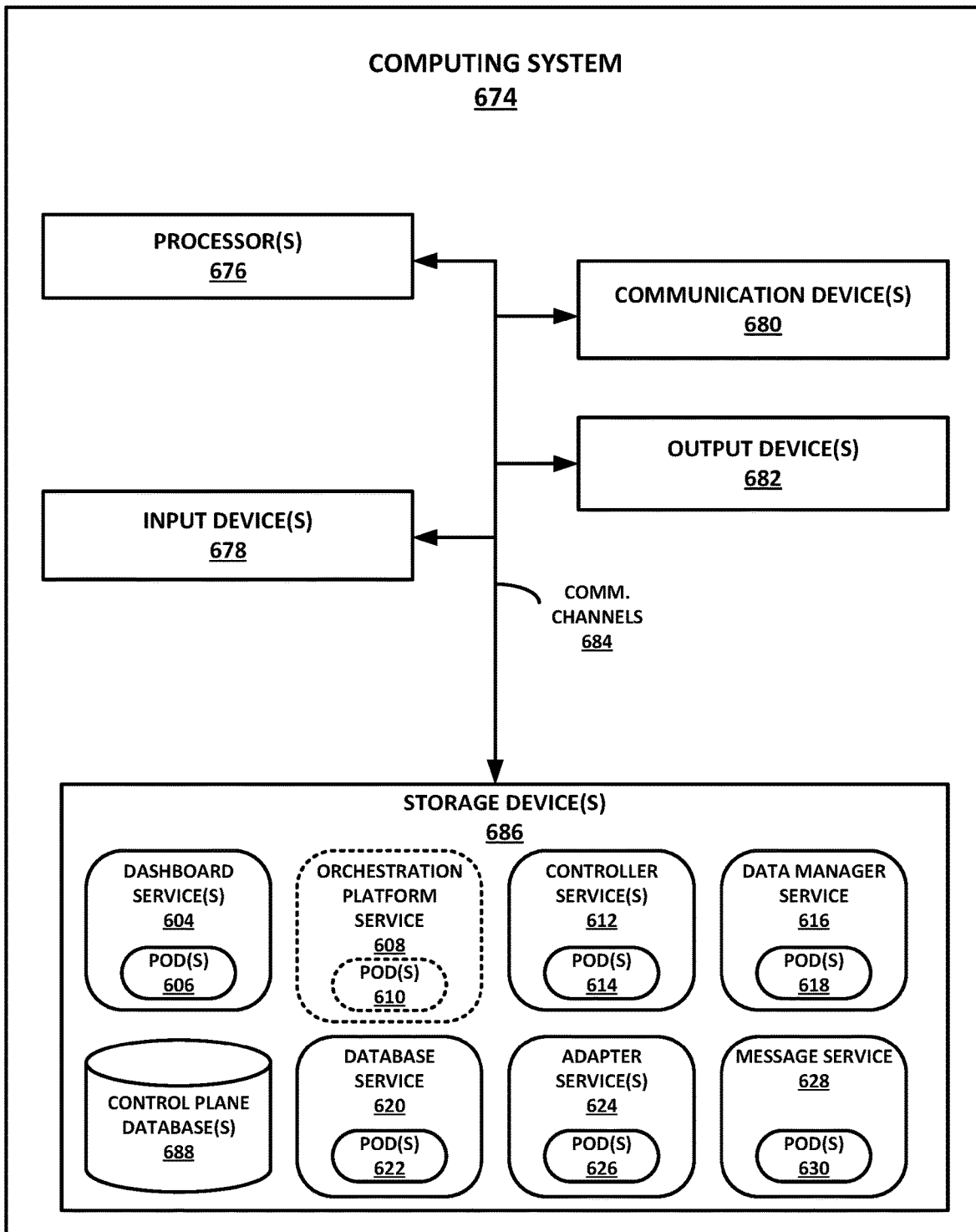
FIG. 6 is a block diagram illustrating an example computing system that includes or implements a scalable telemetry control plane, in accordance with one or more aspects of the present disclosure.

FIG. 6 is a block diagram illustrating an example computing system 674 that may include or implement a scalable telemetry control plane, in accordance with one or more aspects of the present disclosure. For example, computing system 674 may include or implement any one or more of the control planes (e.g., control plane 102, 202, 302) shown in FIGS. 1-5. FIG. 6 illustrates only one particular example of computing system 674, and many other examples of computing system 674 may be used in other instances and may include a subset of the components shown, or may include additional components not shown, in FIG. 6.

As shown in the example of FIG. 6, computing system 674 includes one or more processors 676, one or more input devices 678, one or more communication devices 680, one or more output devices 682, and one or more storage devices 686. In some examples, computing system 674 may not include input devices 678 and/or output devices 682. Communication channels 684 may interconnect each of the components 676, 680, 678, 682, and 686 for inter-component communications (physically, communicatively, and/or operatively). In some examples, communication channels 684 may include a system bus, a network connection, an inter-process communication data structure, or any other method for communicating data between hardware and/or software.

One or more input devices 678 of computing system 674 may receive input. Examples of input are tactile, audio, and video input. Examples of input devices 678 include a presence-sensitive screen, touch-sensitive screen, mouse, keyboard, voice responsive system, video camera, microphone or any other type of device for detecting input from a human or machine.

One or more output devices 682 of computing system 674 may generate output. Examples of output are tactile, audio, and video output. Examples of output devices 682 include a presence-sensitive screen, sound card, video graphics adapter card, speaker, cathode ray tube (CRT) monitor, liquid crystal display (LCD), or any other type of device for generating output to a human or machine. Output devices 682 may include display devices such as cathode ray tube (CRT) monitor, liquid crystal display (LCD), or any other type of device for generating tactile, audio, and/or visual output.

One or more communication devices 680 of computing system 674 may communicate with one or more other computing systems or devices via one or more networks by transmitting and/or receiving network signals on the one or more networks. Examples of communication devices 680 include a network interface card (e.g. such as an Ethernet card), an optical transceiver, a radio frequency transceiver, or any other type of device that can send and/or receive information, such as through a wired or wireless network. Other examples of communication devices 680 may include short wave radios, cellular data radios, wireless Ethernet network radios, as well as universal serial bus (USB) controllers.

One or more storage devices 686 within computing system 674 may store information for processing during operation of computing system 674 (e.g., computing system 674 may store data accessed by one or more modules, processes, applications, services, nodes, application containers, or the like during execution at computing system 674). In some examples, storage devices 686 on computing system 674 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. In some cases, storage devices 686 may include redundant array of independent disks (RAID) configurations and one or more solid-state drives (SSD's).

Storage devices 686, in some examples, also include one or more computer-readable storage media. Storage devices 686 may be configured to store larger amounts of information than volatile memory. Storage devices 686 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 686 may store program instructions and/or data associated with one or more software/firmware elements or modules.

For example, storage devices 686 may store various modules, applications, and/or services, such as dashboard services 604, orchestration platform service 608, controller services 612, data manager service 616, database service 620, adapter services 624, and message service 628. The components stored in storage devices 686 may be examples of similarly named components shown in any of FIGS. 1-5. Dashboard services 604 includes one or more pods 606; orchestration platform service 608 includes one or more pods 610; controller services 612 includes one or more pods 614; data manager service 616 includes one or more pods 618; database service 620 includes one or more pods 622; adapter services 624 includes one or more pods 626; and message service 628 includes one or more pods 630. As shown in FIG. 6, storage devices 686 further includes one or more control plane databases 688. Control plane databases 688 may store any input, configuration, and/or output data associated with any of the one or more control plane services or corresponding pods. In some examples, control plane databases 688 may include one or more time-series data stores.

Computing system 674 further includes one or more processors 676 that may implement functionality and/or execute instructions within computing system 674. For example, processors 676 may receive and execute instructions stored by storage devices 686 that execute the functionality of the nodes, elements, services, and/or modules described herein. These instructions executed by processors 676 may cause computing system 674 to store information within storage devices 686 during program execution. Processors 676 may also execute instructions of an operating system to perform one or more operations described herein.

In some examples, processors 676 may include one or more internal processor cores for executing instructions, one or more internal caches or cache devices, a memory controller, and/or an input/output controller. In some examples, computing system 674 provides an environment of execution for a hypervisor, which is a software and/or firmware layer that provides a light-weight kernel and operates to provide virtualized operating environments for virtual machines, containers, and/or other types of virtual hosts.

Figure 7:
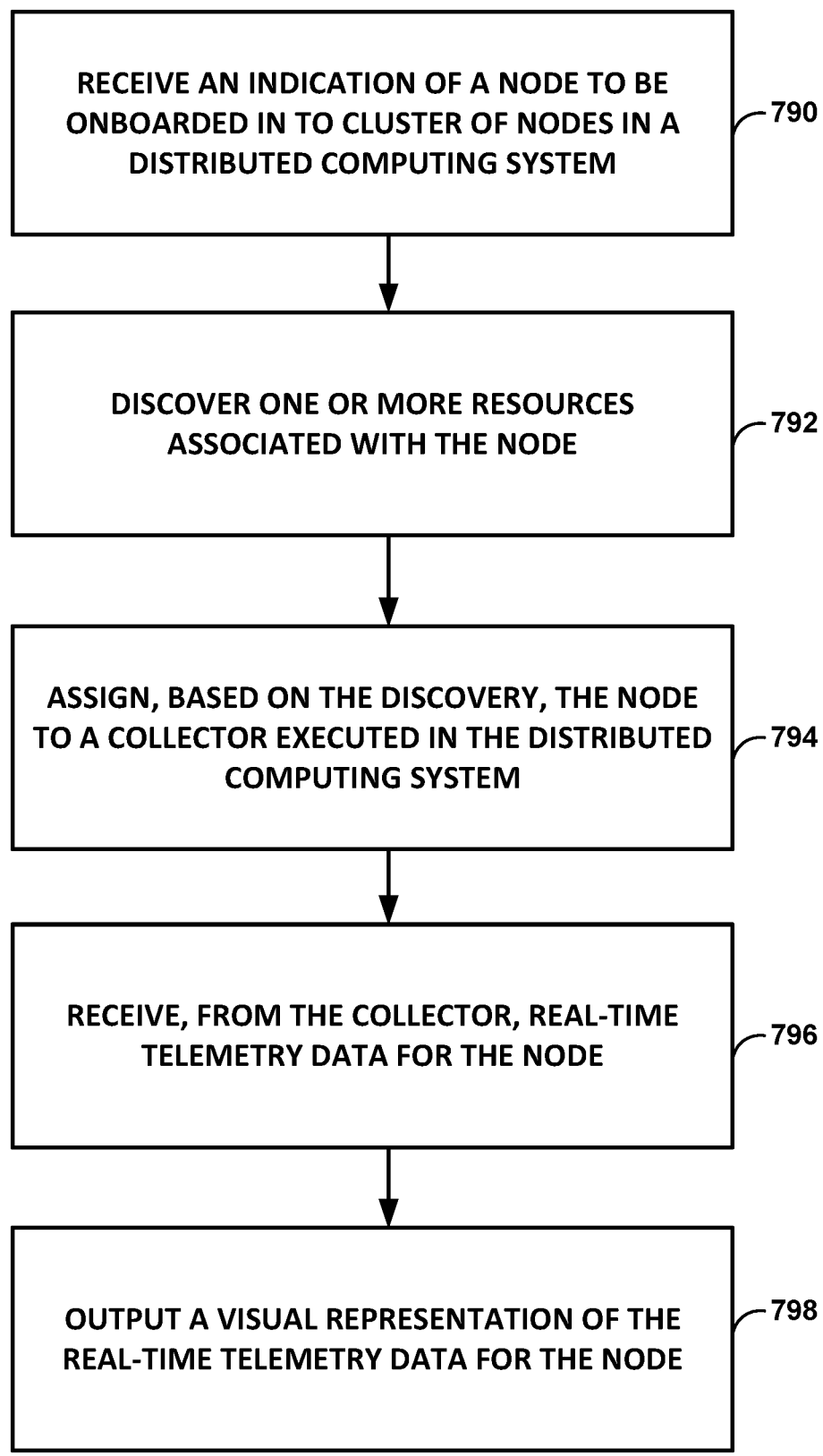
FIG. 7 is a flow diagram illustrating an example process performed by a scalable telemetry control plane, in accordance with one or more aspects of the present disclosure.

FIG. 7 is a flow diagram illustrating an example process performed by a scalable telemetry control plane, in accordance with one or more aspects of the present disclosure. The example process illustrated in FIG. 7 may be performed by one or more computing systems, such as computing system 674 illustrated in FIG. 6 that may include or implement the control plane illustrated described herein and shown in any of FIGS. 1-5.

As shown in the example of FIG. 7, the example process includes receiving (790), by a control plane (e.g., control plane 102) executed on one or more processors (e.g., processors 676) in a distributed computing system (e.g., distributed computing system 100), an indication of a node (e.g., node 148) to be onboarded into the distributed computing system, wherein the node comprises one of a compute node (e.g., compute node 440) or a network device node (e.g., network device node 448). The control plane is configured to onboard both compute nodes and network device nodes into the distributed computing system. The process further includes discovering (792), by the control plane, one or more compute resources or network device resources that are associated with the node.

The process of FIG. 7 also includes assigning (794), by the control plane, the node to a collector (e.g., collector 154) that is executed in the distributed computing system, wherein the collector is configured to collect real-time telemetry data for the node during operation of the node. The control plane is configured to assign the compute nodes and the network device nodes of the distributed computing system to respective compute node collectors or network device node collectors.

In some cases, adapter services (e.g., adapter services 124) of the control plane may be configured to discover one or more compute resources and/or network device resources (e.g., connections, interfaces) for a node. In some cases, based on the discovered resources for the node, controller services (e.g., controller services 112) of the control plane may either identify an existing telemetry collector or instantiate a new telemetry collector, and assign or otherwise associate this collector with the node. Controller services 412 is capable of assigning any of the onboarded nodes into the distributing computing system to respective compute node collectors or network device node collectors, depending on the type of each of the onboarded nodes and/or the resources associated with each of these nodes. In some cases, the controller services may provide, to the collector that is assigned to the node, information about the compute resources or network resources that were discovered by the adapter services. The assigned collector may use such information to further configure the node to initiate the collection of telemetry data for the node, which may be gathered by the collector, based on the discovered resources and/or capabilities of the node.

The process of FIG. 7 also includes receiving (796), by the control plane and from the collector, the real-time telemetry data for the node that is collected by the collector. The process further includes outputting (798), by the control plane and for display (e.g., at client devices 101), a visual representation of the real-time telemetry data for the node.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

The invention claimed is:

1. A method comprising:
receiving, by one or more processors of a distributed computing system, an indication of a node to onboard for the distributed computing system, wherein the one or more processors are configured to onboard a compute node associated with one or more compute resources and to onboard a network device node associated with one or more network device resources in the distributed computing system, and wherein the node comprises one of the compute node or the network device node;
assigning, by the one or more processors, the node to one of a compute node collector or a network device node collector of the distributed computing system based on whether the node comprises the one of the compute node or the network device node;
receiving, by the one or more processors, telemetry data for the node that is collected over a period of time by the one of the compute node collector or the network device node collector assigned to the node; and
outputting, by the one or more processors and for display, a visual representation of the telemetry data for the node.

2. The method of claim 1, wherein receiving the indication of the node to onboard for the distributed computing system comprises receiving, by the one or more processors and from a client device, a request to onboard the node for the distributed computing system.

3. The method of claim 2, further comprising:
outputting, by the one or more processors and for display at the client device, a graphical dashboard that includes a visual representation of one or more nodes in the distributed computing system,
wherein outputting the visual representation of the telemetry data for the node comprises outputting, by the one or more processors and for display at the client device, the visual representation of the telemetry data for the node within the graphical dashboard.

4. The method of claim 2, further comprising:
receiving, by the one or more processors and from the client device, a request to configure one or more alarms associated with the telemetry data for the node.

5. The method of claim 1, wherein the one or more processors execute a control plane comprising one or more services, wherein the one or more services each include one or more pods that are configured to execute at least one respective application or function, and wherein the one or more services comprise at least one of:
one or more dashboard services that at least output the visual representation of the telemetry data for the node;
one or more controller services that at least assign the node to the one of the compute node collector or the network device node collector;
a data manager service that at least receives the telemetry data for the node;
a database service that at least stores the telemetry data for the node;
one or more adapter services that at least discover the one or more compute resources or the one or more network device resources associated with the node; or a message service that at least enables communication between the one or more services of the control plane.

6. The method of claim 5,
wherein (i) when the node comprises the compute node, the compute node collector is executed on the compute node, and the one or more controller services assign the compute node collector to the compute node, or
wherein (ii) when the node comprises the network device node, the network device node collector is executed on another node within the distributed computing system, and the one or more controller services assign the network device node collector to the network device node.

7. The method of claim 5,
wherein the control plane is deployed in a single-node mode or a high-availability mode, and
wherein (i) when the control plane is deployed in the single-node mode, the one or more services of the control plane are executed on a single controller node of the distributed computing system, or (ii) when the control plane is deployed in the high-availability mode, each of the one or more services of the control plane executes in one of an active-active mode or an active-passive mode.

8. The method of claim 7,
wherein the control plane is deployed in the high-availability mode,
wherein the data manager service executes in the active-active mode, and
wherein one pod of the one or more pods of the data manager service is instantiated on the node for execution to receive the telemetry data for the node.

9. The method of claim 8, wherein one of the one or more pods of the data manager service is executed on a plurality of nodes of the distributed computing system to receive respective telemetry data for each of the plurality of nodes.

10. The method of claim 1,
wherein the one of the compute node collector or the network device node collector is executed on either the node or another node within the distributed computing system, and
wherein assigning the node to the one of the compute node collector or the network device node collector comprises providing, by the one or more processors, information associated with the one or more compute resources or the one or more network device resources associated with the node.

11. The method of claim 1,
wherein the one or more compute resources or the one or more network device resources associated with the node include one or more of a connection or a communication interface associated with the node, and
wherein the node comprises one of a bare-metal server or a virtual machine.

12. A computing system comprising:
one or more processors; and
at least one computer-readable storage medium storing instructions that, when executed, cause the one or more processors to:
receive an indication of a node to onboard for a distributed computing system, wherein the instructions cause the one or more processors to onboard a compute node associated with one or more compute resources and to onboard a network device node associated with one or more network device resources in the distributed computing system, and wherein the node comprises one of the compute node or the network device node;
assign the node to one of a compute node collector or a network device node collector of the distributed computing system based on whether the node comprises the one of the compute node or the network device node;
receive telemetry data for the node that is collected over a period of time by the one of the compute node collector or the network device node collector assigned to the node; and
output, for display, a visual representation of the telemetry data for the node.

13. The computing system of claim 12, wherein the instructions stored on the at least one computer-readable storage medium further cause the one or more processors to:
output, for display at a client device, a graphical dashboard that includes a visual representation of one or more nodes in the distributed computing system,
wherein the instructions stored on the at least one computer-readable storage medium that cause the one or more processors to output the visual representation of the telemetry data for the node cause the one or more processors to output, for display at the client device, the visual representation of the telemetry data for the node within the graphical dashboard.

14. The computing system of claim 12, wherein the instructions stored on the at least one computer-readable storage medium cause the one or more processors to execute a control plane comprising one or more services, wherein the one or more services each include one or more pods that are configured to execute at least one respective application or function, and wherein the one or more services comprise at least one of:
one or more dashboard services that are configured at least to output the visual representation of the telemetry data for the node;
one or more controller services that are configured at least to assign the one of the compute node collector or the network device node collector;
a data manager service that is configured at least to receive the telemetry data for the node;
a database service that is configured at least to store the telemetry data for the node;
one or more adapter services that are configured at least to discover the one or more compute resources or the one or more network device resources associated with the node; or
a message service that is configured at least to enable communication between the one or more services of the control plane.

15. The computing system of claim 14,
wherein (i) when the node comprises the compute node, the compute node collector is executed on the compute node, and the one or more controller services assign the compute node collector to the compute node, or
wherein (ii) when the node comprises the network device node, the network device node collector is executed on another node within the distributed computing system, and the one or more controller services assign the network device node collector to the network device node.

16. The computing system of claim 14,
wherein the control plane is configured to be deployed in a single-node mode or a high-availability mode, and
wherein (i) when the control plane is deployed in the single-node mode, the one or more services of the control plane are executed on a single controller node of the distributed computing system, or (ii) when the control plane is deployed in the high-availability mode, each of the one or more services of the control plane is configured to execute in one of an active-active mode or an active-passive mode.

17. The computing system of claim 16,
wherein the control plane is deployed in the high-availability mode,
wherein the data manager service is configured to execute in the active-active mode, and
wherein one pod of the one or more pods of the data manager service is instantiated on the node for execution to receive the telemetry data for the node.

18. The computing system of claim 17, wherein one of the one or more pods of the data manager service is configured to execute on a plurality of nodes of the distributed computing system to receive respective telemetry data for each of the plurality of nodes.

19. The computing system of claim 12,
wherein the one of the compute node collector or the network device node collector is executed on either the node or another node within the distributed computing system, and
wherein the instructions stored on the at least one computer-readable storage medium that cause the one or more processors to assign the node to the one of the compute node collector or the network device node collector further cause the one or more processors to provide information associated with the one or more compute resources or the one or more network device resources associated with the node.

20. A computer-readable storage medium storing instructions that are executable by at least one processor to:
receive an indication of a node to onboard for a distributed computing system, wherein the instructions are executable by the at least one processor to onboard a compute node associated with one or more compute resources and to onboard a network device node associated with one or more network device resources in the distributed computing system, and wherein the node comprises one of the compute node or the network device node;
assign the node to one of a compute node collector or a network device node collector of the distributed computing system based on whether the node comprises the one of the compute node or the network device node;
receive telemetry data for the node that is collected over a period of time by the one of the compute node collector or the network device node collector assigned to the node; and
output, for display, a visual representation of the telemetry data for the node.

* * * * *